(12) United States Patent
Vessels et al.

(10) Patent No.: US 11,770,363 B2
(45) Date of Patent: Sep. 26, 2023

(54) SYSTEMS AND METHODS FOR SECURE ACCESS SMART HUB FOR CYBER-PHYSICAL SYSTEMS

(71) Applicant: Honeywell International Inc., Charlotte, NC (US)

(72) Inventors: Ly Vessels, Chandler, AZ (US); Daniel Tyler, Gilbert, AZ (US); William Neumann, Robbinsdale, MN (US)

(73) Assignee: Honeywell International Inc., Charlotte, NC (US)

( * ) Notice: Subject to any disclaimer, the term of this patent is extended or adjusted under 35 U.S.C. 154(b) by 252 days.

(21) Appl. No.: 17/239,172

(22) Filed: Apr. 23, 2021

(65) Prior Publication Data

US 2021/0336930 A1      Oct. 28, 2021

Related U.S. Application Data

(60) Provisional application No. 63/014,866, filed on Apr. 24, 2020.

(51) Int. Cl.
*H04L 9/40* (2022.01)
*H04W 76/15* (2018.01)

(52) U.S. Cl.
CPC ........ *H04L 63/0263* (2013.01); *H04L 63/166* (2013.01); *H04W 76/15* (2018.02)

(58) Field of Classification Search
CPC ............... H04L 63/0263; H04L 63/166; H04L 63/0281; H04L 63/0464; H04L 67/12; H04W 76/15
See application file for complete search history.

(56) References Cited

U.S. PATENT DOCUMENTS

| | | | |
|---|---|---|---|
| 2006/0248083 A1* | 11/2006 | Sack | G06F 21/6218 707/999.009 |
| 2007/0055891 A1* | 3/2007 | Plotkin | G06F 21/6236 713/189 |
| 2009/0010233 A1* | 1/2009 | Pratt, Jr. | G01D 21/00 370/338 |
| 2018/0115633 A1* | 4/2018 | Dhanawade | H04L 12/00 |
| 2020/0285738 A1* | 9/2020 | Tippenhauer | G06F 21/554 |
| 2021/0099479 A1* | 4/2021 | Prusov | G06F 8/65 |

OTHER PUBLICATIONS

Extended European Search Report dated Sep. 16, 2021 in European Application No. 21170018.2 (7 pages).

* cited by examiner

*Primary Examiner* — Amie C. Lin
(74) *Attorney, Agent, or Firm* — Bookoff McAndrews, PLLC

(57) ABSTRACT

Systems and methods are disclosed for providing a secure communication between a first network and a second network. The method may include receiving, at a Secure Access Smart Hub (SASH), a signal from the first network requesting a communication connection; establishing a first connection between the first network and the SASH; establishing a second connection between the SASH and the second network; receiving, at the SASH, data from the first network having a first protocol; translating the data having the first protocol into data having a second protocol; and transmitting the data from the SASH to the second network.

18 Claims, 15 Drawing Sheets

US 11,770,363 B2

SYSTEMS AND METHODS FOR SECURE ACCESS SMART HUB FOR CYBER-PHYSICAL SYSTEMS

RELATED APPLICATIONS

This application claims the benefit of priority to U.S. Provisional Application No. 63/014,866 filed Apr. 24, 2020, the entirety of which is incorporated herein by reference.

TECHNICAL FIELD

Various embodiments of the present disclosure generally relate to a connected communication environment consisting of cyber-physical systems (CPS) devices and, more particularly, to providing a secure, smart network device that allows for a connected communication of CPS devices.

BACKGROUND

Cyber-physical systems (CPS) operate under an assumption that the software operating the physical aspects of a system are safe, but many of these systems were developed before the concept of cyber-crime. While there is considerable effort to improve the security of these cyber-physical systems, there is less focus on weaving security into the software as it is developed throughout its life-cycle. The result of this lack of focus is the need for expensive perimeter protection solutions.

Current installations of CPS components are often set up so that the CPS network is unprotected against traffic eavesdropping, injection, and manipulation. Additionally, the CPS networks, in part due to the lack of protection, may be isolated from enterprise management networks, requiring tasks such as configuration, maintenance, and updating on a manual basis. When a site has hundreds to thousands of these devices, some in physically hard to reach locations, these processes require an enormous investment in time and effort.

One security solution such as a virus/malware scanning software may be employed to detect a presence of malicious software on a computing platform. However, these solutions require advanced hardware and software that may not be found in a CPS device. Thus, there may be a need to determine an authenticity of software/firmware on a CPS device that does not have the hardware or the software to host a traditional file scanning solution.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods disclosed relate to providing a secure, smart network device that allows for a connected communication environment consisting of CPS devices.

A computer-implemented method is disclosed for providing a secure communication between a first network and a second network, the method including: receiving, at a Secure Access Smart Hub (SASH), a signal from the first network requesting a communication connection; establishing a first connection between the first network and the SASH; establishing a second connection between the SASH and the second network; receiving, at the SASH, data from the first network having a first protocol; translating the data having the first protocol into data having a second protocol; and transmitting the data from the SASH to the second network.

A system is disclosed for providing a secure communication between a first network and a second network, the system including: a memory storing instructions; and a processor executing the instructions to perform a process including: receiving, at a Secure Access Smart Hub (SASH), a signal from the first network requesting a communication connection; establishing a first connection between the first network and the SASH; establishing a second connection between the SASH and the second network; receiving, at the SASH, data from the first network having a first protocol; translating the data having the first protocol into data having a second protocol; and transmitting the data from the SASH to the second network.

A non-transitory computer-readable medium is disclosed for storing instructions that, when executed by a processor, cause the processor to perform a method for providing a secure communication between a first network and a second network, the method including: receiving, at a Secure Access Smart Hub (SASH), a signal from the first network requesting a communication connection; establishing a first connection between the first network and the SASH; establishing a second connection between the SASH and the second network; receiving, at the SASH, data from the first network having a first protocol; translating the data having the first protocol into data having a second protocol; and transmitting the data from the SASH to the second network.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
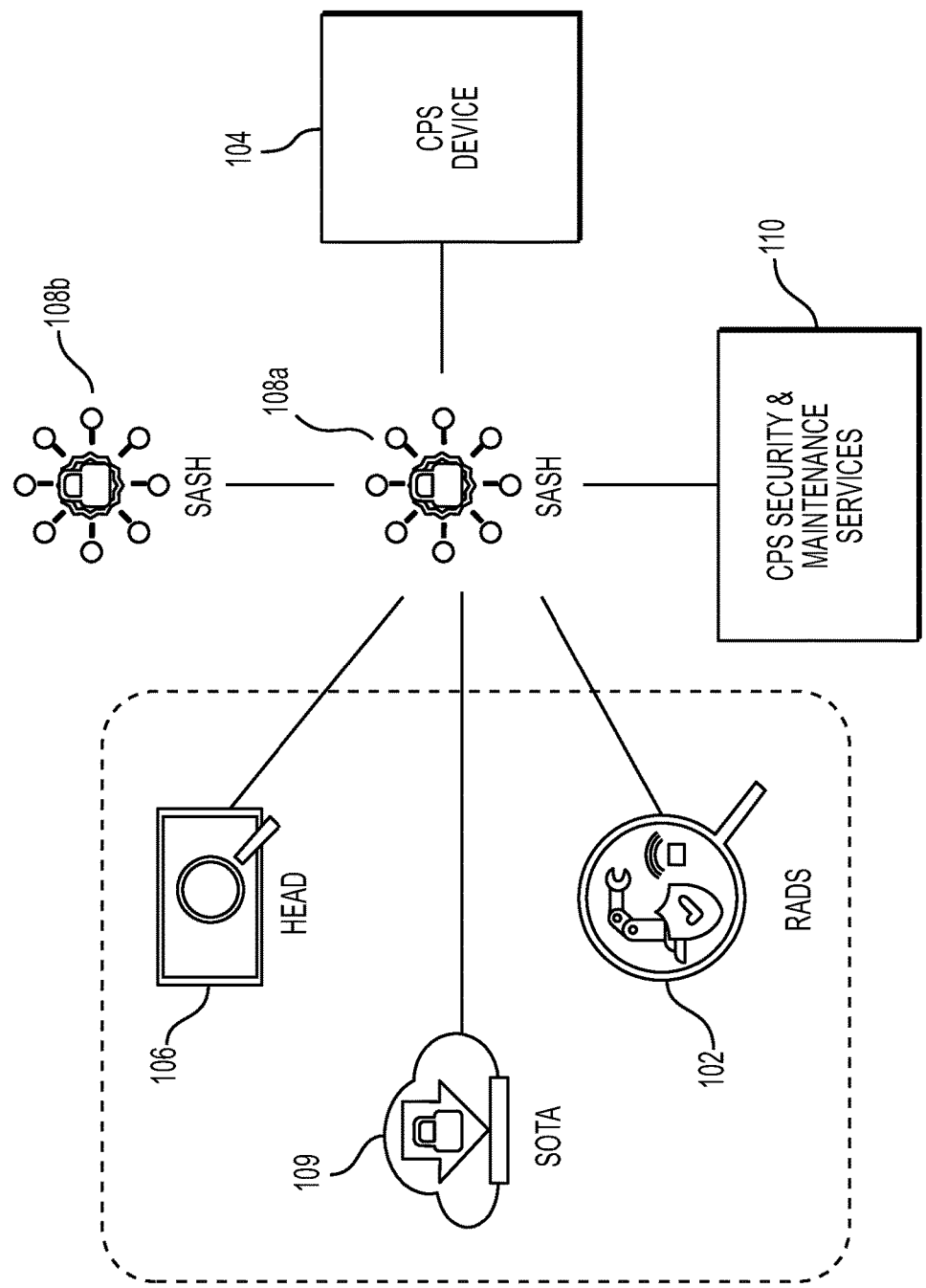
FIG. 1 depicts an example Secure Access Smart Hub (SASH) Context View, according to one or more embodiments.

The following embodiments describe methods and systems for a Secure Access Smart Hub (SASH) system. As described above, there is a need to provide a secure, smart network device that allows for a connected communication environment consisting of CPS devices.

As described in more detail below, the present disclosure relates to one or more objectives including: providing a secure, smart network device that enables for a connected communication environment consisting of CPS devices; allowing distributed management and control of maintenance, monitoring, control and upgrade capabilities; providing a secure end-to-end communication from a Security Service system to the CPS device; using Internet Protocol Security (IPSec) (e.g., enterprise network protocol) to assure the communication, including the Profinet® traffic, without affecting the CPS operations; using a firewall to filter out any network packets that may not comply with the rules set up by the SASH administrator; providing network layer security via an IPSec implementation; providing protection for the Profinet® traffic from source to destination (CPS devices); acting as a translating gateway, taking TCP/IP traffic addressed to a CPS device and repacking it into Profinet® messages for delivery to the CPS over an existing Profinet® connection; bridging an enterprise configuration, update, and management network to the CPS network in a secure manner; securely bridging the enterprise management network to the CPS network while providing network layer security for all traffic, including Profinet® traffic into the CPS devices themselves, rather than terminating any secure connection at the Profinet® master and leaving the last hop exposed to adversaries; and creating a SASH Network that allows the CPS devices to be connected to deliver security and maintenance services to the CPS devices;

One or more technical benefits provided by the embodiments disclosed herein may include: reduction in amount of time and effort spent in management and update of devices on the CPS network as compared to the current practice, which may require these tasks to be performed manually on an individual basis; increasing the security posture for the CPS devices and the network as a whole, while allowing for centralization of CPS configuration, management, and updates, greatly reducing the time and effort required to perform these tasks; allowing a security provider to offer the current CPS device as smart CPS devices without modification to the current solution; and enabling for meeting security requirements for CPS devices without modifying the current CPS devices.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Certain terms may be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

The below description includes a System Architecture Description (SAD) and a System Requirements Specification (SRS). For the SAD, the description includes a system architecture overview of the SASH, physical view, logical view, data view, security view, dynamic behavior view, and deployment view. The system architecture overview includes the various perspectives (e.g., context, system, hardware, software, data, security, interface, dynamic behavior, and deployment) to select implementation technology (e.g., make vs buy decision) and development. For the SRS, the description includes a system overview, functional features, data requirements, hardware requirements, security requirements, and system restraints.

As an overview of the SAD, the Secure Access Smart Hub (SASH) provides secure communication between the Platform Enterprise (TCP/IP network) and the CPS devices (e.g., fieldbus network) without modification to the existing CPS devices or interfering with executing operational activities. For example, the SASH may be a network device that: bridges an enterprise network to the Cyber-Physical System (CPS) field bus network to provide security and maintenance services; routes all secure communication among all of the SASHes; thus, creating a SASH Network for enterprise to securely communicate with fieldbus devices; filters all network traffic to the CPS device; and/or performs secure Profinet® communication to the CPS devices.

According to one or more embodiments, the SASH may be an apparatus that is constructed using any one or any combination of the technologies, techniques, and methods described below. The SASH hardware may be any computing platform with one or more of the following: firmware secure boot, trusted platform module, read-only memory, random access memory, Ethernet network interface (one for TCP/IP and one for Profinet communication), Profibus network Interface (Profibus communication), screen for administration, and/or ruggedized for military use. The SASH may use IPSec to secure Profinet® communication between the SASH and CPS device. Previous systems do not secure fieldbus communication into the fieldbus device. The SASH may use VPN IPSec Tunnel to secure Ethernet communication between the SASH and the Platform Enterprise systems to provide communication to enterprise resources and other SASHes. The SASH may implement protocol mapping between TCP/IP over Ethernet to IPSec protected Profinet® network protocols. The SASH may implement IP Routing to send network packets to another SASH. The SASH may perform a firewall function to provide network safeguard to the CPS device. The SASH may provide network isolation between the CPS Enterprise and the CPS device. The SASH may implement NIST SP 800-53 to assure medium robustness.

As described above, one or more objectives of the specification of the SASH may be to provide a system architecture overview of the SASH, including the various perspectives (context, system, hardware, software, data, security, interface, dynamic behavior, and deployment) for selecting implementation technology (make vs buy decision) and development; and formally capture the SASH architecture. It should be understood that the SASH is not restricted to the SAD provided below and that there may be variations to the SAD in alternative embodiments.

The capabilities highlights section describes the capabilities provided by the system. The system architecture overview section provides an overview of the system in the context of its users and other external systems it interacts with. The physical view section describes the hardware architecture that the software runs on and the interactions/relationships between the components. The logical view section describes the top-level software architecture and the interactions/relationships between the components. The data view section captures the data architecture of the system; specifically, the data structure and the relationships among the data/components. The security view section describes the system architecture with security measures and security relevant components. The dynamic behavior view section describes the behavior of the system over time and the various states the components of the system may be in. The deployment view section captures the system deployment environment.

Referring now to the appended drawings, FIG. 1 depicts an example Secure Access Smart Hub (SASH) Context View, according to one or more embodiments. Secure Access Smart Hub (SASH) 108a is a Cybersecurity IP that provides the capabilities to securely connect multiple industrial and service domains. Its capabilities are to (1) create secure bridge between multiple domains, such as: services (e.g., Authentication Manager, Maintenance Monitors, etc.) 110, Secure-Over-the-Air (SOTA) server 109, Secure Maintenance Device (SMD), Profibus network of CPS devices 104, Remote Anomaly Detection System (RADS) 102, Security Provider's Embedded Anomaly Detector (HEAD) 106, and/or additional SASH servers; (2) providing routing services to send network packets to another SASH 108b; (3) providing firewall capabilities to safeguard the CPS devices; providing network isolation between the CPS Enterprise and the CPS devices; and/or (4) design to obtain favorable outcome from NIST RMF assessment.

According to one or more embodiments, the SASH box and SASH network provide a connected communication environment for various interactions with CPS devices, allowing distributed management and control of maintenance, monitoring, control and upgrade capabilities.

Figure 2:
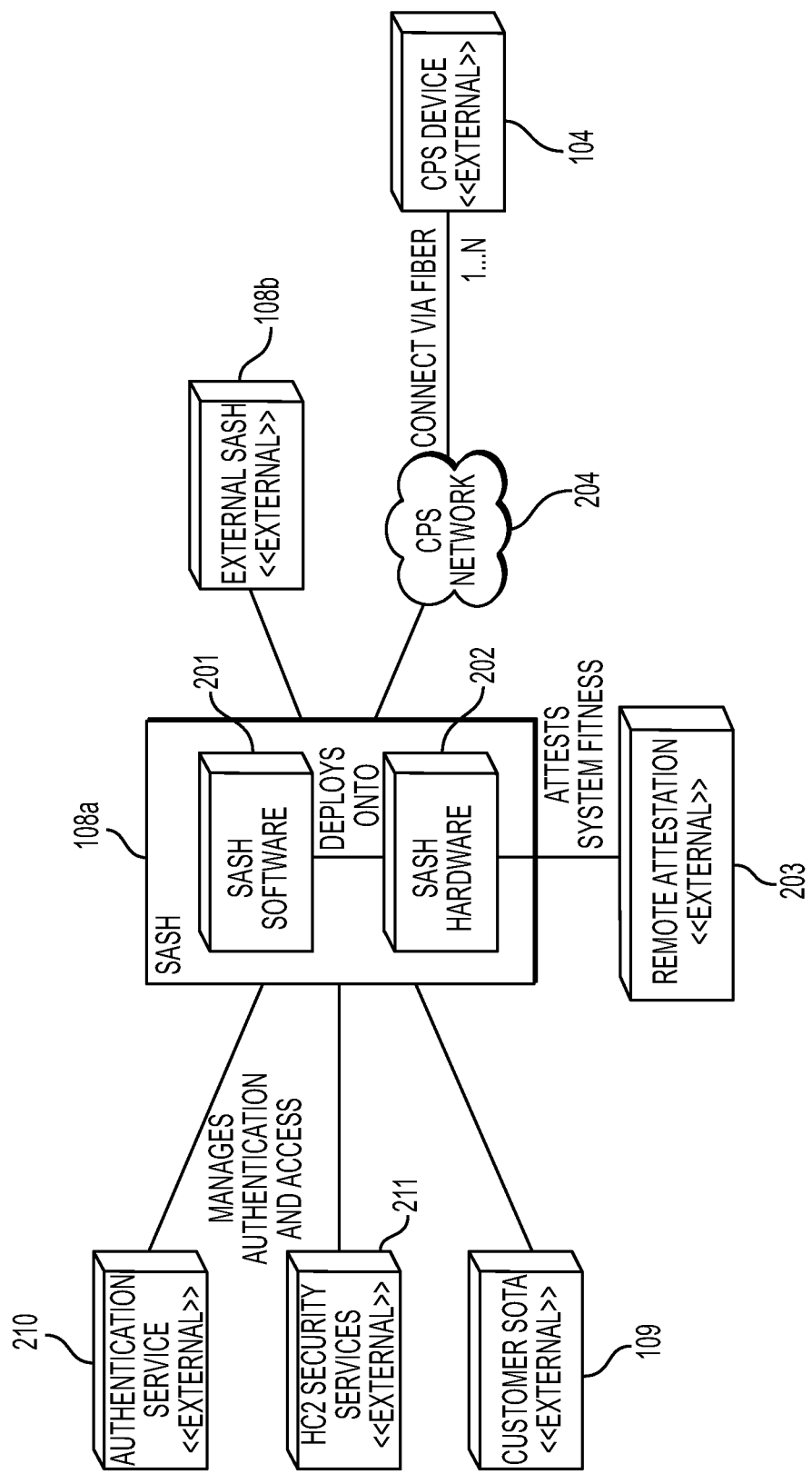
FIG. 2 depicts an example SASH System Architecture Overview, according to one or more embodiments.

FIG. 2 depicts an example SASH System Architecture Overview, according to one or more embodiments. The SASH 108a system architecture includes two main subsystems, the SASH Software 201 and SASH Hardware 202. The SASH Hardware 202 and SASH Software 201 may be integrated together and then connected to the various external domains to be bridged including additional SASH boxes, forming the SASH network. The SASH 108a interacts with external systems including other SASH's 108b, servers, networks (e.g., CPS network 204), the CPS Authentication Manager 210, other services.

According to one or more embodiments, the SASH software includes four logical domains: the platform domain, gateway domain, security domain, and/or the CPS domain, each domain with their respectful software components. The SASH hardware 202 includes three main components: the processing suite, the network/communication ports, and/or the physical chassis.

According to one or more embodiments, the customer SOTA 109 is a subsystem that resides at the CPS platform along with the SMD and CPS devices.

According to one or more embodiments, the CPS device 104 is a subsystem that resides at the CPS platform along with the customer SOTA 109, SASH 108a, and SMD. Running on the CPS device is a receive process whose purpose is to listen on the SASH network for a secure connection request from the customer SOTA 109 or to the CPS's configuration port for a direct connection from the SMD. Once a connection is made, the process will receive the update package, verify the authenticity and integrity of the package, and store it in protected memory on the CPS until the installation process is triggered on the CPS.

According to one or more embodiments, the SASH 108a may be connected with other external SASHes in order to create lager SASH networks that encompass a number of smaller subnetworks.

According to one or more embodiments, the Cyber Security Services 211 are a suite of services such as RADS 102, which is used to verify the integrity of data stored on the CPS devices.

According to one or more embodiments, the Remote Attestation Server 203 is an external trusted server that can objectively assess the health of the Supplier and customer SOTAs 109.

Figure 3:
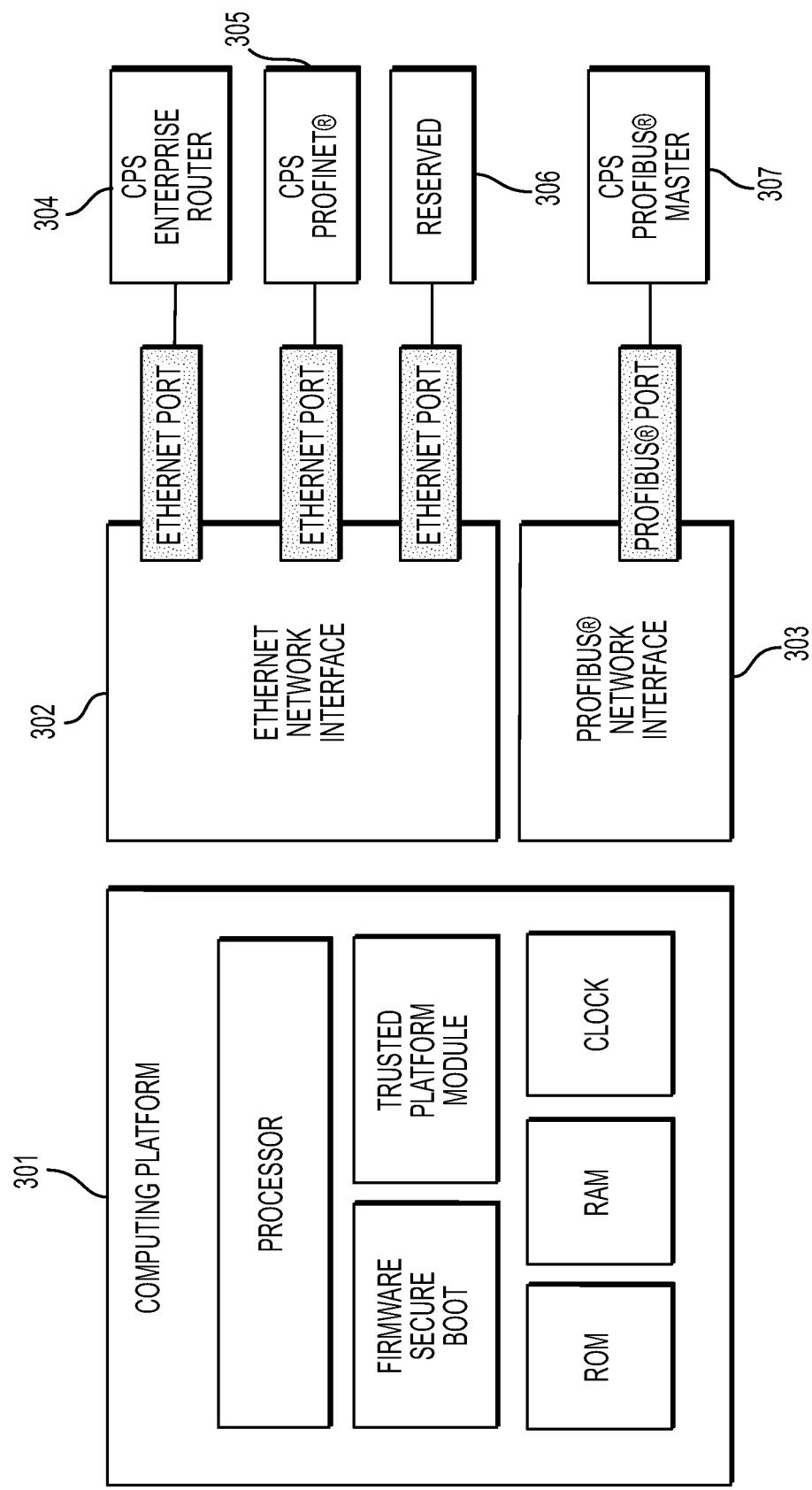
FIG. 3 depicts an example SASH Hardware View including Major Components of the SASH Hardware, according to one or more embodiments.

FIG. 3 depicts an example SASH hardware view including major components of the SASH Hardware, according to one or more embodiments. The SASH hardware includes three main components: the computing platform 301, the Ethernet network interface 302, and the Profibus® network interface 303. However, example embodiments do not restrict the network interface to the Profibus® and/or other network interfaces, including, but not limited to CAN bus, Modbus®, Ethernet, or RS485 may be used.

According to one or more embodiments, the SASH form factor will allow for three Ethernet-based network connections, a Profibus® connection, and the processing suite needs, and the facility power source available to the SASH box. Additionally, the physical structure may be ruggedized in order to meet the platform-specific shock, vibration, and environmental resistance specifications.

According to one or more embodiments, the SMD Software is designed to deploy on any computing platform 301 that supports one or more of the following capabilities: (1) Firmware Secure Boot, which assures that SMD only boots software that is trusted by the Original Equipment Manufacturer (OEM). The SMD accepts any protocols that the computing platform uses to authenticate the bootloader (e.g., Unified Extensible Firmware Interface (UEFI) Secure Boot); (2) Trusted Platform Module, which is a secure crypto-processor that assists with generating, storing, and limits the use of cryptographic keys to booting modules, attestation, and a Connected Cyber Port Tamper Detector (PTD); (3) ROM with sufficient memory to host the SMD Agent and extension of the Configuration Port Device Driver; (4) RAM with sufficient memory to log security events for the SMD activities; and/or (5) Clock, which provides accurate time for security event time-stamp.

According to one or more embodiments, the SASH Ethernet Network Interface 302 is the physical structure of the SASH device, providing a location for secure, rugged mounting of the Ethernet ports configured to connect to a Profinet network, a CPS enterprise router, and other Ethernet-based devices using the reserved port. The SASH Ethernet Network Interface may be provisioned with three physical ports for connecting to various networks and devices such as: CPS Enterprise Router 304, CPS Profinet Network 305, and/or External Services 306 such as the customer SOTA 109 and Authentication Services. The form factor of these ports may depend on the needs of these services. The final physical configuration of these ports and connector-types may depend on the needs of the services being connected to; however a hardened RJ-45 type connector such as the Am phenol RJFTV7SA1G may be used.

According to one or more embodiments, the SASH Profibus Interface 303 is the physical structure of the SASH box, providing a location for secure, rugged mounting of a Profibus-compatible port for communication with a Profibus master device.

According to one or more embodiments, the SASH Ethernet Network Interface 302 is provisioned with one physical port for connecting to the profibus master device as a profibus client. The final physical configuration of these ports and connector-types may depend on the needs of the service being connected to, however, a hardened copper-based connector such as the MS5015 14-2S bulkhead connector may be used.

According to one or more embodiments, the SASH Enclosure will allow for three Ethernet-based network connections, one Profibus connection, containment and mounting of the processing suite, and connection to the facility power source available to the SASH box. Additionally, the physical structure may be ruggedized for in order to meet the platform-specific shock, vibration, and environmental resistance specifications.

Figure 4:
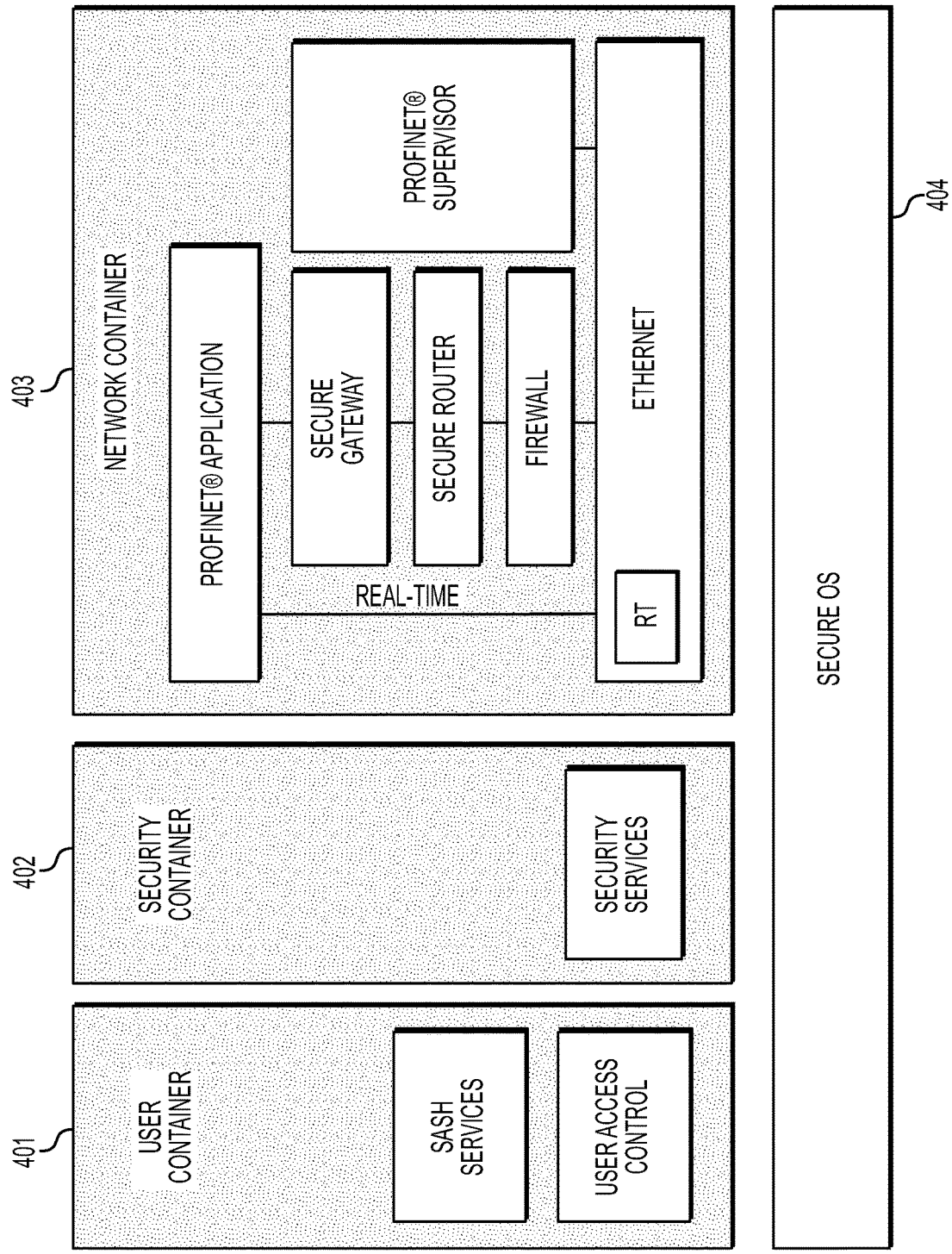
FIG. 4 depicts an example SASH Logical System Overview, according to one or more embodiments.

FIG. 4 depicts an example SASH Logical System Overview, according to one or more embodiments. The software aspect of the SASH includes three major subsystems: the User Subsystem, the Security Subsystem, and the Network Subsystem. These subsystems may be realized using secure OS containers supported by a Secure OS 404 which underlies all of the SASH software. These subsystems, their components, and relationship are shown in FIG. 4.

According to one or more embodiments, the User Container 401 is the subsystem that interacts with the external users and authentication systems. The User Container 401 also provides the interfaces used to install, configure, and maintain the SASH 108a. This includes communications with the external Authentication Service 210 and the Remote Attestation Server 203. Access to the other containers is controlled through the SASH's security policies.

According to one or more embodiments, the Security Container 402 is a privileged container that contains SASH related security data and function. Only the SASH Security Operator can access this container. Otherwise, this container receives security audit events from the other containers and record them accordingly. This container may require the underlying Secure OS 404 to ensure that only specific process/function can access this container. This is enforced by the SASH's access security policies.

According to one or more embodiments, the Network Container 403 is the subsystem that interacts with the other networked cyber security technologies, e.g., the customer SOTA 109 and other SASH units. These communication services can only proceed if the SASH successfully mutually authenticates with the cyber security technology. One of the service-to-service authentication methods is to use the Media Access Control address as identity and exchanging and verifying certificates linked to those identities which are signed by a shared root of trust.

According to one or more embodiments, communications may take place over an Ethernet media layer, secured by IPSec, both for the connections to the CPS Enterprise Network (containing devices such as the SOTA, RADS, and other SASH units) and the CPS network that connects CPS devices. As the SASH may need to communicate with the CPS network, it has the ability to operate as a Profinet® Supervisor to enable these communications where needed. Additionally, the SASH will support the Profinet® Real Time modes of communication.

According to one or more embodiments, the SASH may connect to the CPS enterprise network to enable communications with the customer SOTA 109, RADS, and other services to provide security and/or maintenance services. These communications may take the form of TCP and/or UDP/IP traffic, which is protected by IPSec, implemented at the network layer of the networking stack. When a message needs to be sent across this network, the two endpoints may establish a secure IPSec tunnel first, and then pass the message across this tunnel.

According to one or more embodiments, the SASH provides a gateway service connecting the CPS Enterprise network to the CPS network. In addition to acting as a standard gateway between two networks, the SASH acts as a protocol translator, taking standard IP traffic (with IPSec protection) from the CPS Enterprise network and translating the content of the transmission into the Profinet® non-real time protocol. Any communications between the SASH and the CPS Enterprise system and between the SASH and a CPS device may be done across a secure IPSec tunnel that the two endpoints mutually establish. Any traffic crossing the boundary between the CPS Enterprise network into the CPS Network may decrypt its content at the IPSec layer, extract and repackage as Profinet® traffic before to transmission to the CPS network.

According to one or more embodiments, the packets in transit are protected by the IPSec layer of the connection established between the SASH and CPS device. Similarly, traffic from CPS Enterprise network to SASH may decrypt (by the incoming IPSec layer), extract from the Profinet® protocol encapsulation and sent to the appropriate destination in the CPS Enterprise network as standard IP traffic. The packets in transit are protected by the IPSec layer on the outbound connection.

According to one or more embodiments, the SASH may provide routing services for the CPS network and for the CPS Enterprise network. The routing may be standard IP routing for routing in both the IP traffic in the customer SOTA 109 network and the Profinet® non-real time traffic in the CPS network. Any Profinet® RT traffic on the CPS network is not routable, and thus will not be affected by the routing functionality of the SASH.

According to one or more embodiments, the SASH 108a may provide a firewall to filter out packets that do not conform to the firewall rules established by the SASH security administrator crossing the boundary between the CPS network and the CPS Enterprise network.

According to one or more embodiments, the SASH 108a has the ability to operate as a Profinet® Supervisor to enable communications with established Profinet® networks where needed. Additionally, the SASH will support the Profinet® Real Time modes of communication.

According to one or more embodiments, the traffic traversing the CPS network side of the SASH may be Profinet® traffic of two forms. The first form is Profinet® RT traffic which is the real-time fieldbus traffic that carries commands, status, etc. traffic between the control servers and the CPS devices. The second form is Profinet® IO NRT traffic, which will include payloads such as the update packages sent from the customer SOTA 109 to some set of CPS devices. This Profinet® traffic is created at the application layer and is encapsulated in IPSec protected IP packets at the network layer.

According to one or more embodiments, the SASH 108a may be running a security enhanced operating system such as SELinux to provide access control, security policies and enforcement, and privilege minimization. This Operating system will underlie the entire SASH software system.

Figure 5:
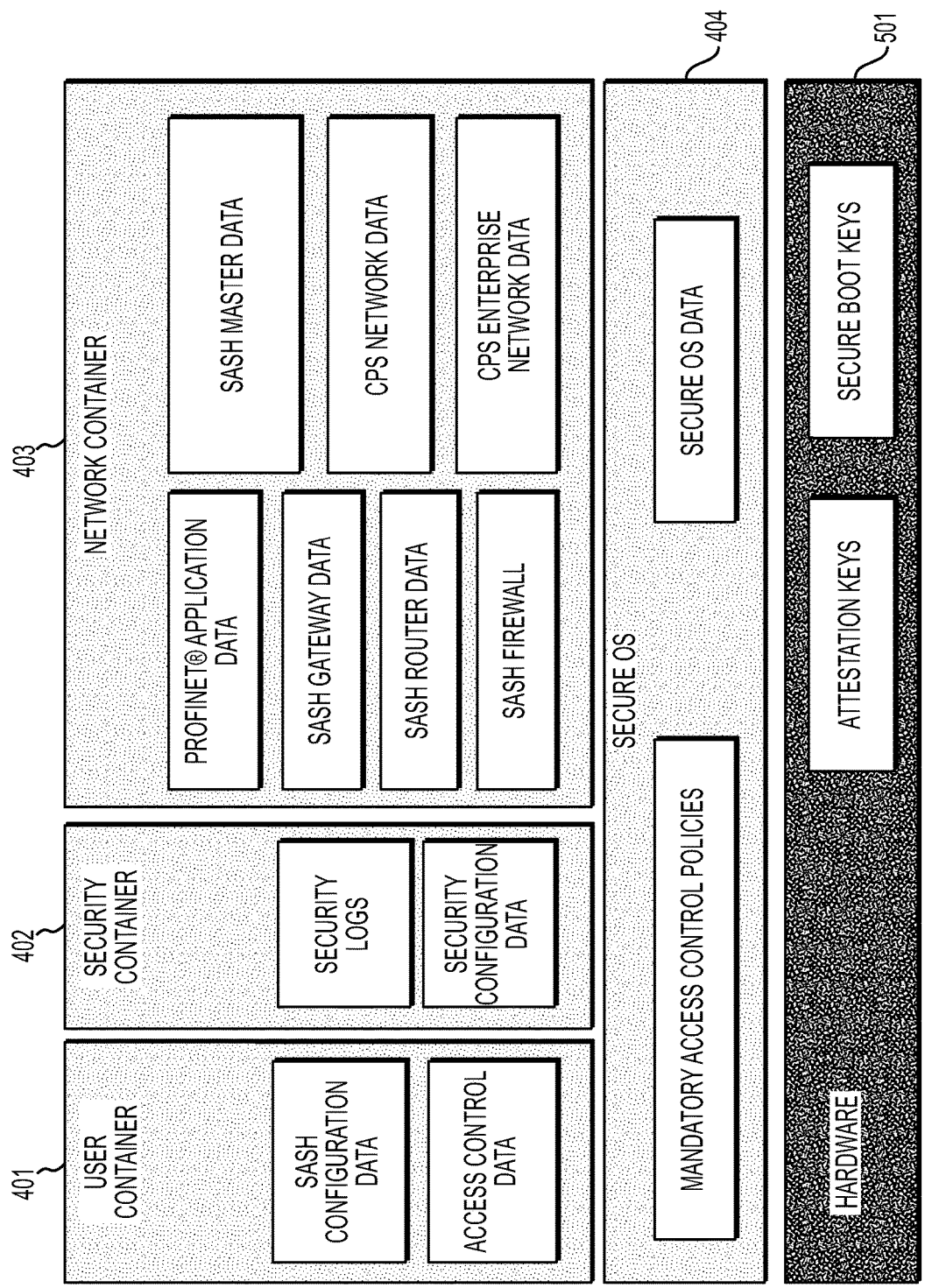
FIG. 5 depicts example SASH System Data, according to one or more embodiments.

FIG. 5 depicts example SASH System Data, according to one or more embodiments. According to one or more embodiments, the SASH 108a houses the root of trust key for secure boot as well as the attestation key used to ensure the hardware 501 boots into a known good state and maintains that level of soundness. The keys store in this SASH may conform to the trusted platform module of the selected tablet solution.

According to one or more embodiments, the Secure OS Data includes all of the configuration data for the OS including the data that may be required by the system to enable its secure communications and operations. This data includes authentication data, PKI executable software, PKI keys and certificates, and/or security configuration files. This data also includes the access control policies that dictate access throughout the system. The data contents may be a mixture of binary and plain text files with other formats.

According to one or more embodiments, the SASH user domain contains SASH user specific data including any access control data that the SASH may use along with the secure OS 404 to govern access to data and other system objects on the system.

According to one or more embodiments, the SASH security domain contains security related data such as access control and security audit logs. Only the SASH security administrator can access and administer these data within this domain.

According to one or more embodiments, there are five types of network data that are used by the SASH, the Profinet® network data, the gateway and router data, the firewall data, CPS Enterprise network data, and/or the CPS Network data. These are described below.

According to one or more embodiments, the network container 403 may need access to any Profinet® application data that is flowing through or from it so that it can create appropriate Profinet® messages and set them through the IPSec secure networking stack (or directly to the Ethernet link layer if real time communications are needed).

According to one or more embodiments, the network container 403 will have access to read, create, and modify the data necessary to maintain maps to successfully pass network traffic between the CPS Enterprise network and the CPS network. Additionally, as the SASH 108a will operate as a translation gateway between the two domains, the gateway domain will have access to the application layer data that is being sent across the gateway as Profinet® is an application layer protocol.

According to one or more embodiments, the SASH may have access to read, create, and modify the routing tables for routing traffic between locations within the CPS Enterprise network or the CPS network.

According to one or more embodiments, the SASH provides a mechanism for the SASH administrator to create firewall rules that can be enacts to protect the traffic to the CPS network. This mechanism can be used locally or remotely using the browser through HTTPS. By default, the SASH provides templates for common scenarios to rapid deployment.

According to one or more embodiments, the SASH will have access to the TCP/IP traffic flowing across the network as it routes it to the correct destination either within the platform domain or passes it across the gateway to the CPS domain. This traffic consists of standard TCP/IP traffic which will have its payloads protected by IPSec. The SASH will only require access to the IP headers so the traffic can be routed towards its appropriate destination.

In order to provide privacy and authentication for this traffic via IPSec, the SASH 108a will create and store some data used to create and manage the secure channels, including the security association data and security parameters, any public key certificates and any stored keys or keying material.

According to one or more embodiments, the SASH 108a will also store and access the configuration data for the SASH as well as any access control and operating system data that are required to operate and to regulate access to the SASH assuring only authorized users are able to access its functionality.

According to one or more embodiments, in the CPS domain, the SASH will have access to the Profinet® over IP traffic flowing between the SASH and the CPS domain. This traffic will consist of non-real time Profinet® packets, which are just Profinet® messages that make up the application layer payload what is encapsulated by a standard TCP header and footer and then by an IPSec header and footer. Additionally, the SASH may be able to create and store data such as the information base describing the topology of the platform domain network used for routing traffic between various destinations on the CPS network.

According to one or more embodiments, in order to provide privacy and authentication for this traffic via IPSec, the SASH may be able to create and store some data used to create and manage the secure channels, including the security association data and security parameters, any public key certificates and any stored keys or keying material.

Figure 6:
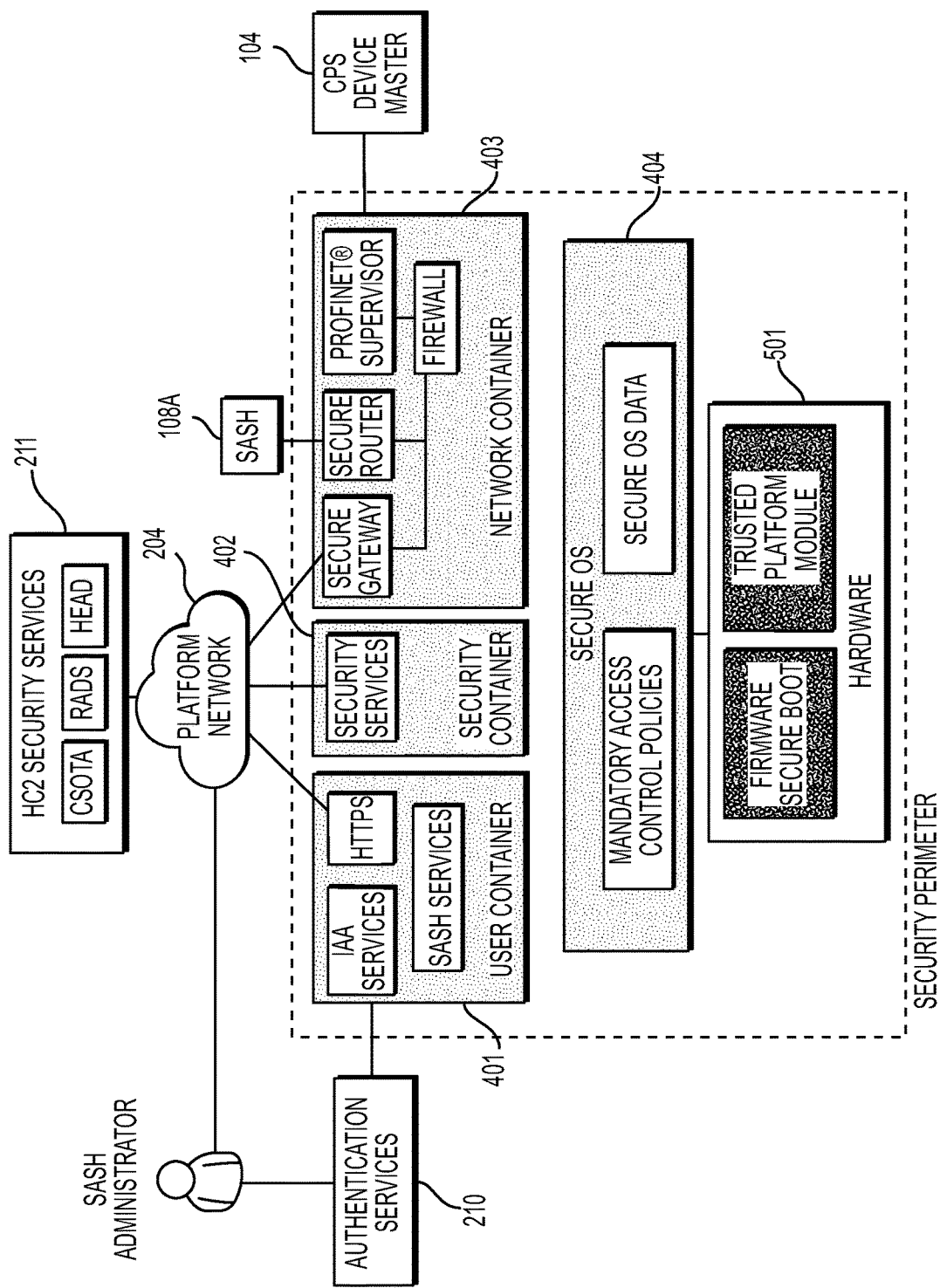
FIG. 6 depicts example SASH Assets and Security Objectives, according to one or more embodiments.

FIG. 6 depicts example SASH Assets and Security Objectives, according to one or more embodiments. The SASH 108a uses the original measurements of the bootloader, operating systems, and/or device drivers and compares them to the current measurement to determine the integrity of these startup elements. The Secure Boot and Trusted Platform Module on the server will ensure the computer runs only trusted software on startup, helping to protect the system from rootkits, bootkits, and other malware. The TPM will interface with the customer's remote attestation service to independently and objectively assess the health and trustworthiness of the SASH 108a.

According to one or more embodiments, the SASH identification, authentication, and authorization (IAA) services subsystem will interface with the customer's authentication system to govern access to the system, ensuring only authorized users are able to access the system. The authentication subsystem will support multi-factor authentication for additional security.

According to one or more embodiments, the SASH meets the integrity and authenticity requirements by assuring that it is booted to a trusted operating system by using the hardware Secure Boot feature. Before the kernel module is launched, the bootloader measures the various kernel modules and authenticates using Remote Attestation supported by the hardware and operating system boot process. The last step of the boot process is to check for malware. Once the operating system is booted users may then be authenticated is access is needed. Access is controlled using Discretionary Access Control and Mandatory Access Control.

According to one or more embodiments, all network traffic crossing the SASH security boundary to or from either a platform device, a CPS device, or to another SASH, may be protected by IPSec. These secure tunnels will not only provide confidentiality for the information flowing along those channels, but the channels will also be mutually authenticated, assuring the device at each endpoint that it is communicating with another valid device within its ecosystem.

Figure 7:
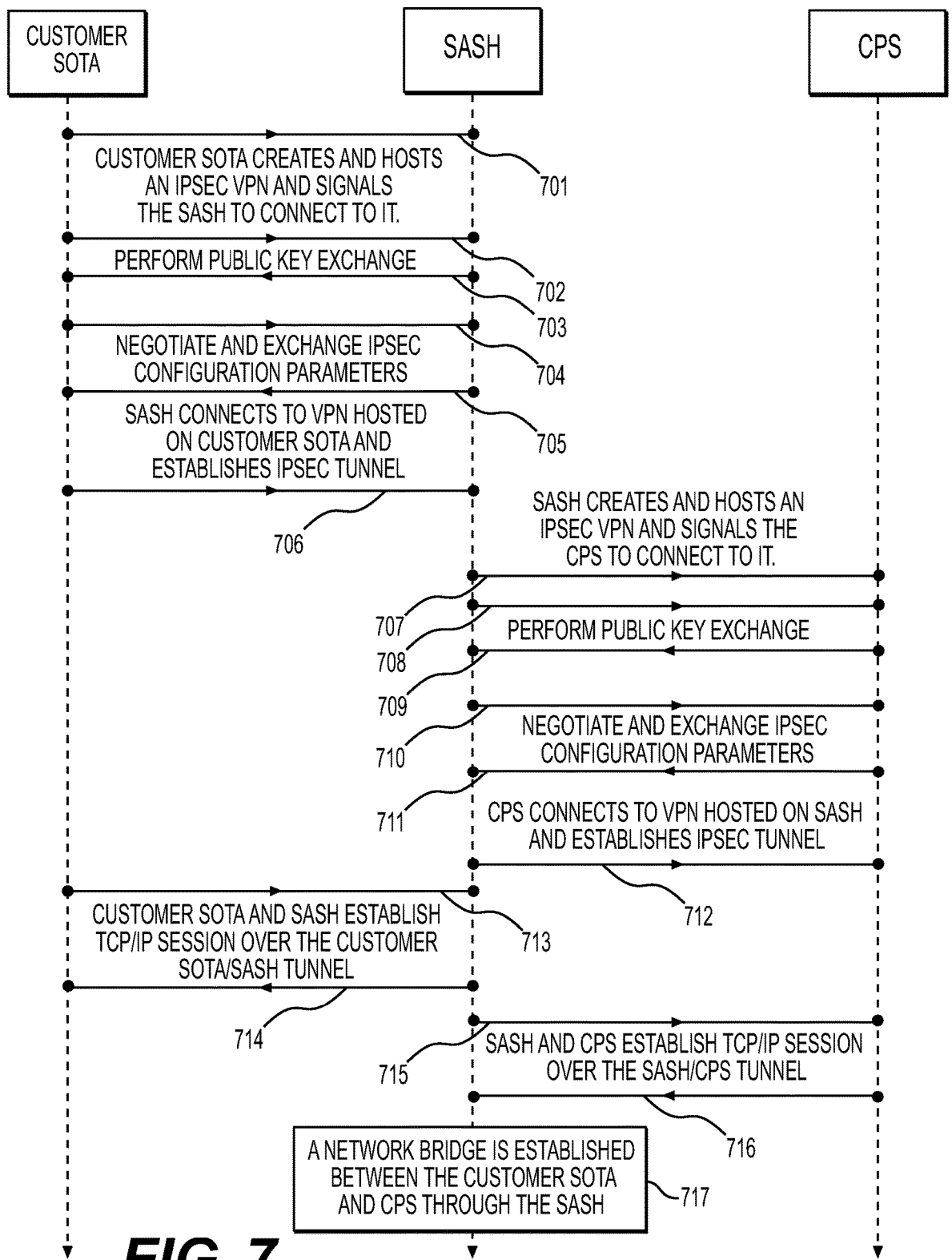
FIG. 7 depicts an example flowchart illustrating events following an initiation for a data transfer session, according to one or more embodiments.

FIG. 7 depicts an example flowchart illustrating events following an initiation for a data transfer session, according to one or more embodiments. As depicted in FIG. 7, the customer SOTA 109, SASH, and CPS may execute a sequence of procedures in order to establish a secure communication session between the customer SOTA 109 and the CPS.

According to one or more embodiments, to start the development of a communication session between the customer SOTA 109 and the CPS, the end-user may signal from the customer SOTA 109 to the SASH 108a that a secure IPSec connection should be established. In step 701, a secure connection (e.g., VPN connection) between the customer SOTA 109 to the SASH 108a is created. In steps 702 and 703, a public key is exchanged between the customer SOTA 109 and the SASH 108a. In steps 704 and 705, customer SOTA 109 and the SASH 108a negotiate and exchange IPSec configuration parameters. In step 706, the SASH 108a connects to the VPN hosted on customer SOTA 109 and establishes an IPSec tunnel.

According to one or more embodiments, in step 707, the SASH 108a creates and hosts an IPSec VPN and signals the CPS device 104 to connect to it. In steps 708 and 709, a public key is exchanged between the CPS device 104 and the SASH 108a. In steps 710 and 711, CPS device 104 and the SASH 108a negotiate and exchange IPSec configuration parameters. In step 712, the CPS device 104 connects to the VPN hosted on SASH 108a and establishes an IPSec tunnel.

In steps 713 and 714, the customer SOTA 109 and the SASH 108a establish a TCP/IP session over the channel between the customer SOTA 109 and the SASH 108a. In steps 715 and 716, the SASH 108a and the CPS device 104 establish a TCP/IP session over the channel between the SASH 108a and the CPS device 104.

According to one or more embodiments, in step 717, a network bridge is established between the customer SOTA 109 and the CPS device 104 through the SASH 108a.

Figure 8:
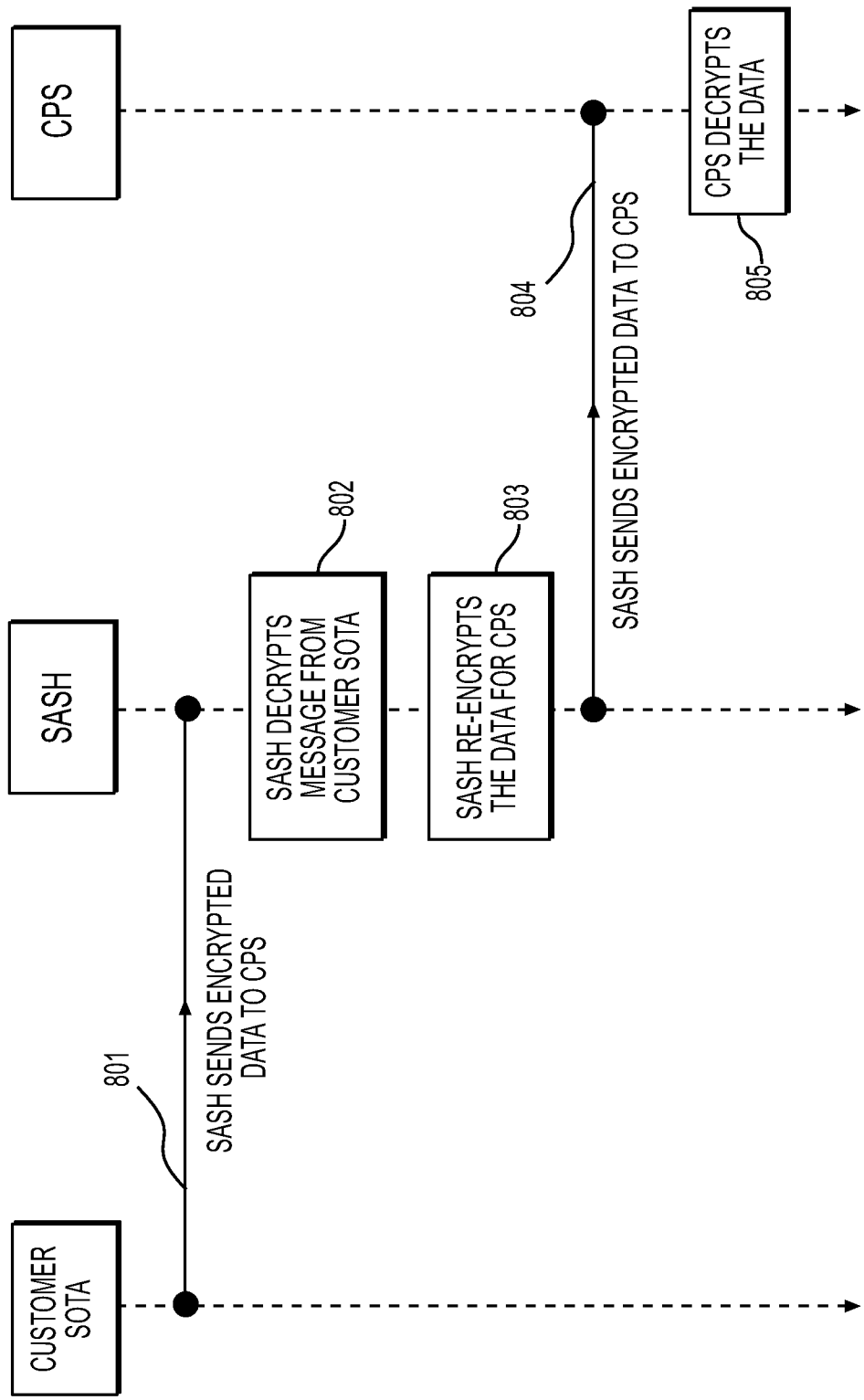
FIG. 8 depicts an example flowchart illustrating a sequence of events following the establishment of a virtual private network (VPN) network bridge, according to one or more embodiments.

FIG. 8 depicts an example flowchart illustrating a sequence of events following the establishment of a VPN network bridge, according to one or more embodiments. As depicted in FIG. 8, after the secure network bridge between the customer SOTA 109 and CPS device 104 is established through the SASH 108a, the secure data transfer from the customer SOTA 109 to the SASH 108a may commence.

For example, according to one or more embodiments, the SASH receives data that has been passed up through the network and transport layers of the networking stack associated with the Platform network port and extracts the application layer data bound for the CPS device 104. That is, in step 801, the customer SOTA 109 sends encrypted data to the SASH 108a. In step 802, the SASH 108a decrypts the message from the customer SOTA 109. The application layer data is then passed into the transport and network layers of the networking stack associated with the CPS network port. In step 803, the data is re-encrypted as directed by the security association governing communications with the CPS device 104 across the secure connection. In step 804, the re-encrypted data is sent across the CPS network to its destination and is received by the CPS device 104. In step 805, the CPS passes the data up through its network stack where it is decrypted by the IPSec implementation in its network layer and extracted for further processing by the application layer.

Figure 9C:
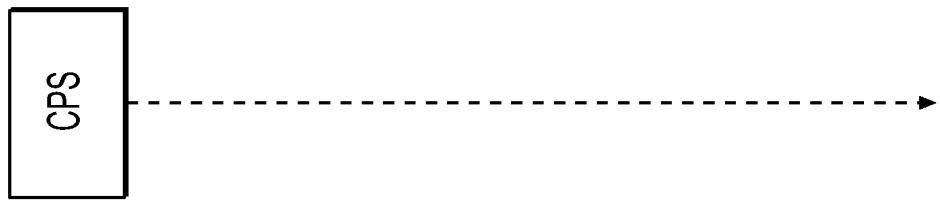
FIGS. 9A to 9C depict example flowcharts illustrating a sequence of events following a completion of data sent to CPS, according to one or more embodiments.
Figure 9B:
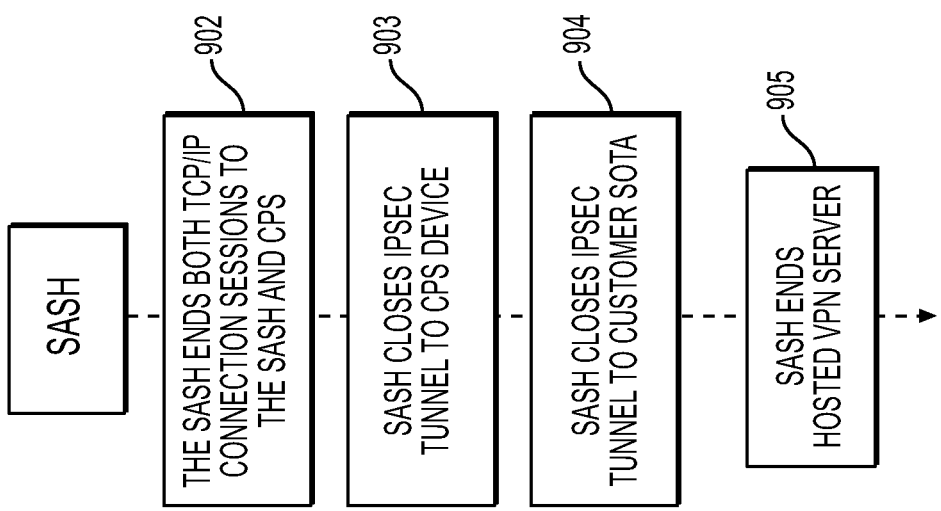
Figure 9A:

FIGS. 9A to 9C depict a sequence of events following the completion of data sent to CPS, according to one or more embodiments. As illustrated in FIGS. 9A to 9C, once the data is finished transferring from the customer SOTA 109 to the CPS, the secure IPSec channel for the connection between the customer SOTA 109 to the SASH, and the IPSec connection between the SASH 108a to the CPS should be ended. These sequences are shown in steps 901 to 905 of FIGS. 9A to 9C. For example, in step 902, the SASH 108a ends both TCP/IP sessions to the SASH 108a and the CPS device 104. In step 903, the SASH 108a closes the IPSec tunnel to the CPS device 104. IN step 904, the SASH 108a closes the IPSec tunnel to the customer SOTA 109. In steps 901 and 905, the customer SOTA 109 and the SASH 108a end the hosted VPN servers.

According to one or more embodiments, the SASH may include a SASH chassis, which includes all of the hardware and software components for the SASH. The SASH may be connected to two separate networks: (1) the Platform network, which includes the customer SOTA 109, the other cyber security services, such as the RADS, and other SASH units that connect to their own subnetworks; and (2) the CPS network, which includes CPS devices, Profinet® masters for the CPS devices, and controllers for driving the CPS device operations.

TABLE 1

Traceability matrix

| SASH Feature Number | Title | How Met Type | How Met |
|---|---|---|---|
| SASH-FUNC-001 | Install SASH | Architect | 1. Design the SASH function to be installed by End-User. |
| SASH-FUNC-002 | Update SASH Firmware | Architect, Trade Study, Invent | 1. Design the SASH function to accept Firmware Upgrades 2. Trade study to identify authentication solution. If no solution exists, invent. |
| SASH-FUNC-003 | Configure SASH Parameters | Architect, Trade Study, Invent | 1. Design the SASH function to accept Configuration 2. Trade study to identify authentication solution. If no solution exists, invent. |
| SASH-FUNC-004 | Perform production testing of SASH | Architect | 1. Design SASH to allow for production acceptance testing. |
| SASH-FUNC-005 | Connect multiple SASH boxes to form a SASH network | Trade Study, Invent | 1. Trade study to identify suitable modular networking hardware for connecting multiple SASH devices 2. If no suitable modular networking hardware exists, invent. |
| SASH-FUNC-006 | Establish secure communication between various systems | Trade Study, Invent | 1. Trade study to identify suitable network protocols for creating SASH network 2. If no suitable protocols exist, invent. |
| SASH-FUNC-007 | Bridge various network domains | Trade Study, Invent | 1. Trade study to identify suitable modular networking hardware for connecting devices to SASH network. 2. If no suitable modular networking hardware exists, invent. |
| SASH-FUNC-008 | Establish secure communication between outside systems | Trade Study, Invent | 1. Trade study to identify suitable network protocols for creating SASH network 2. If no suitable protocols exist, invent. |
| SASH-FUNC-009 | Bridge outside network domains | Trade Study, Invent | 1. Trade study to identify suitable modular networking hardware for connecting devices to SASH network. 2. If no suitable modular networking hardware exists, invent. |
| SASH-DATA-001 | Process SASH software, firmware, and data | Trade Study, Invent | 1. Trade study to identify data processing hardware to allow for SASH to process these data types. 2. If no suitable processing hardware solutions exist, invent. |
| SASH-DATA-002 | Bridge multiple SASH domains | Trade Study, Invent | 1. Trade study to identify suitable network protocols for creating SASH network 2. If no suitable protocols exist, invent. |
| SASH-DATA-010 | Bridge SOTA to Internal Services | Trade Study, Invent | 1. Trade study to identify suitable modular networking hardware for connecting devices to SASH network. 2. If no suitable modular networking hardware exists, invent. |
| SASH-DATA-011 | Bridge SOTA to Profibus | Trade Study, Invent | 1. Trade study to identify suitable modular networking hardware for connecting devices to SASH network. 2. If no suitable modular networking hardware exists, invent. |

TABLE 1-continued

Traceability matrix

| SASH Feature Number | Title | How Met Type | How Met |
|---|---|---|---|
| SASH-DATA-021 | Bridge SMD to Profibus | Trade Study, Invent | 1. Trade study to identify suitable modular networking hardware for connecting devices to SASH network. 2. If no suitable modular networking hardware exists, invent. |
| SASH-DATA-022 | Bridge SMD to Internal Services | Trade Study, Invent | 1. Trade study to identify suitable modular networking hardware for connecting devices to SASH network. 2. If no suitable modular networking hardware exists, invent. |
| SASH-HW-001 | Can be installed in platform environment | Architect | 1. Design the SASH hardware and function to be installed into the platform environment |
| SASH-HW-002 | Ruggedized for military use | Trade Study, Invent | 1. Trade study to identify hardware which is pre-ruggedized for use on platform. 2. If no suitable hardware exists, invent. |
| SASH-HW-003 | Hardware Specification | Trade Study, Invent | 1. Trade study to identify hardware which meets processing capability, persistent memory, volatile memory, network connectivity requirements. 2. If no suitable hardware exists, invent. |

Below is a description of the SRS, which includes a system overview, functional requirements, data requirements, hardware requirements, security requirements, and system restraints. The SASH 108a is a device that provides cybersecurity and maintenance CPS communication. For example, the SASH 108a (1) bridges the communication from platform enterprise to CPS devices, (2) routes packages among other SASH devices, and (3) provides firewall protection to the CPS device.

According to one or more embodiments, the SASH 108a: (1) creates a secure bridge between multiple domains, such as services (e.g., Authentication Manager, Maintenance Monitors, etc.), Secure-Over-the-Air (SOTA) server, a SMD, Profinet® network of CPS devices, and/or additional SASH boxes; and/or (2) designs to obtain favorable outcome from NIST RMF assessment.

According to one or more embodiments, the SASH box and SASH network provide a connected communication environment for communication with CPS devices, allowing distributed management and control of maintenance, monitoring, control and upgrade capabilities.

Below, the system-level features for the SASH system are described. One or more objectives of this specification of the SASH are to provide a system overview of the SASH, including definition, goals, objectives, context, and major capabilities, and to specify its associated features, such as business requirements, functional requirements, data requirements, hardware requirements, system security requirements, and/or system constraints.

According to one or more embodiments, the Secure Access Smart Hub (SASH) provides trusted and secured communication networking capabilities to a given Cyber-Physical System (CPS) and associated management systems (e.g., Secure Over-The-Air update system (SOTA) or Secure Management Device (SMD)).

According to one or more embodiments, an objective of the Secure Access Smart Hub (SASH) system is to provide a bridge hub that enables connection of CPSs without disrupting the CPS operating environment.

For example, the SASH 108a provides one or more of the following benefits to users, certification, and a security provider. According to one or more embodiments, the SASH 108a will provide its customers with the capabilities to securely connect a security provider's actuation devices; and create an actuation LAN which enables distributed services such as Secure CPS updates, provisioning of cryptographic keys, monitoring of CPS conditions, and offloading of logs.

According to one or more embodiments, the SASH 108a is a secure to moderate impact level of NIST RMF using NIST SP 800-53 security controls to assure that the SASH is assessable & authorizable in accordance to NIST RMF.

According to one or more embodiments, the SASH 108a will give a security provider the capability to provide connected services to our customer that was previously not possible. For example, the SASH 108a provides remote CPS condition monitoring, testing of the CPS on a digital twin without disruption of operation, and reduced time to update CPSs through use of the SOTA Update.

As an example, one example of a deployment environment may be targeted for a valve actuator. For this example, the valve actuator may include one or more of the following features:

TABLE 2

Example Product Features
Features

Connectors. The exterior enclosure of the actuator assembly may contain receptacle connectors.
The controller configuration interface may be used by the actuator supplier and end user for loading software revisions, firmware revisions, diagnostics, production testing (as applicable), and parameter configuration.
The network ports and controller configuration interface may be secured when not in use (e.g., physical lock).
All Software and firmware revisions may have capability to be updated from the controller configuration interface and not require actuator removal from valve assembly or disassembly of actuator.
The network ports and controller configuration interface may have a purchaser approved means to accomplish software configuration management and cyber security.
All receptacles may require strain relief and may be covered when not in use].
To facilitate connection and disconnection of connectors, clearance may be maintained between the connector and any obstruction, so that the connectors can be grasped firmly by the hand and allow for rotation of the hand.
The actuator design may also utilize connectors as approved by the purchaser to ease disassembly of the controller, motor or other sub components from the actuator assembly for repair/maintenance."
Configuration interface.
The controller may have one controller configuration interfaces for each actuator type.
The controller configuration interface may be a standard industry connection, such as Ethernet, RS 485, or RS 232.
The controller configuration interface may be used by the Actuator Supplier for loading software revisions, diagnostics, production testing (as applicable), and parameter configuration.
Any ports on the controller may be physically secured when not in use.
The port may be disabled when not in use and comply with cyber security requirements.
The configuration interface may be approved by the purchaser.
Data element description.
Characteristics of individual data elements that the interfacing entities will provide, store, send, access, receive, etc., such as:
Name of Data Element
Data type (alphanumeric, integer, etc.)
Size and format (such as length and punctuation of a character string)
Units of measurement (such as meters, nanoseconds)
Range or enumeration of possible values (such as 0-99)
Accuracy (how correct) and precision (number of significant digits)
Priority, timing, frequency, volume, sequencing, and other constraints, such as whether the data element may be updated and whether special rules apply
Security and privacy (personnel records) constraints
Sources (setting/sending entities) and recipients (using/receiving entities)"
Data assembly description.
Characteristics of data element assemblies (records, messages, files, arrays, displays, reports, etc.) that the interfacing entities will provide, store, send, access, receive, etc., such as:
Name of data assembly
Data elements in the assembly and their structure (number, order, grouping)
Medium (such as disk or memory) and structure of data elements/assemblies on the medium
Access characteristics (Read, Write)
Priority, timing, frequency, volume, sequencing, and other constraints, such as whether the assembly may be updated and whether special rules apply
Security and privacy constraints
Sources (setting/sending entities) and recipients (using/receiving entities)"
Provide port blockers for all physical ports that are accessible on the exterior of the actuator and not normally populated. Also provided may be the special purpose tool used to remove the port blockers.
All data port accessible on the exterior of the actuator enclosure may have a dedicated purpose.
All physical ports of the actuator may be disabled when not in use.
All ports may be disabled by default, with the exception of port(s) used for initial configuration.
The actuator may only permit configuration of parameters via the configuration port(s).
All passwords, to include those associated with factory accounts, may be changeable.
The actuator may continuously maintain state information (e.g., previous 'n' processes, initial failure exception, stack, etc.) necessary to determine the cause of a failure.
The actuator configuration software will provide a method to verify integrity and authenticity of installation media prior to installation on actuator.
The actuator may employ internal integrity verification tools to detect unauthorized modification to programming or data.
The actuator may ensure that programming and data is write protected at all times except when write protection is locally disabled by the operator to perform authorized modifications.

TABLE 2-continued

Example Product Features
Features

Disabling the write protection on actuator programming and data may only occur on the
specific memory devices that need to be modified.
The actuator may store all programming and data on a permanently attached memory
device.
The actuator may perform configurable pre-defined actions if anomalies are detected or
communications are interrupted.
The actuator software and/or firmware may perform bounds checking on all
configurable parameters to ensure they are within acceptable ranges.
The actuator may perform pre-defined actions if anomalies are noted during integrity
data verification (e.g., malware discovered, corrupted data).
Only hardware and programming necessary for operation, maintenance, and security of
the actuator may be included in the system.
Actuator software/firmware may not contain hidden accounts or passwords.
Actuator ports may not utilize any form of auto execution of software and/or firmware.
The actuator may have the capability to perform a memory dump of all programming
and data.
Software/firmware may fail to a known secure state.
Software/firmware may recover securely from failures.
The actuator may utilize secure versions of ports, protocols, and services.
Software/firmware may securely recover from buffer overflows in order to prevent
escalation of privileges that may result in the execution of unauthorized code.
The vendor may provide source code which will be escrowed to the customer.
The vendor may provide for secure delivery from the vendor to the customer.
The actuator may communicate only with other systems necessary to support the
required functions of the interconnected systems.
Only those parameters necessary to support the required functions of the
interconnected systems may be passed from the actuator to external systems.
Only those parameters necessary to support the required functions of the
interconnected systems may be received and processed by the actuator from external
systems.
Interfaces to external systems may be explicitly defined such that only pre-defined data
can be received from or transmitted to the external system.
Modification of actuator programming and data may only occur using a local device.

Figure 10:
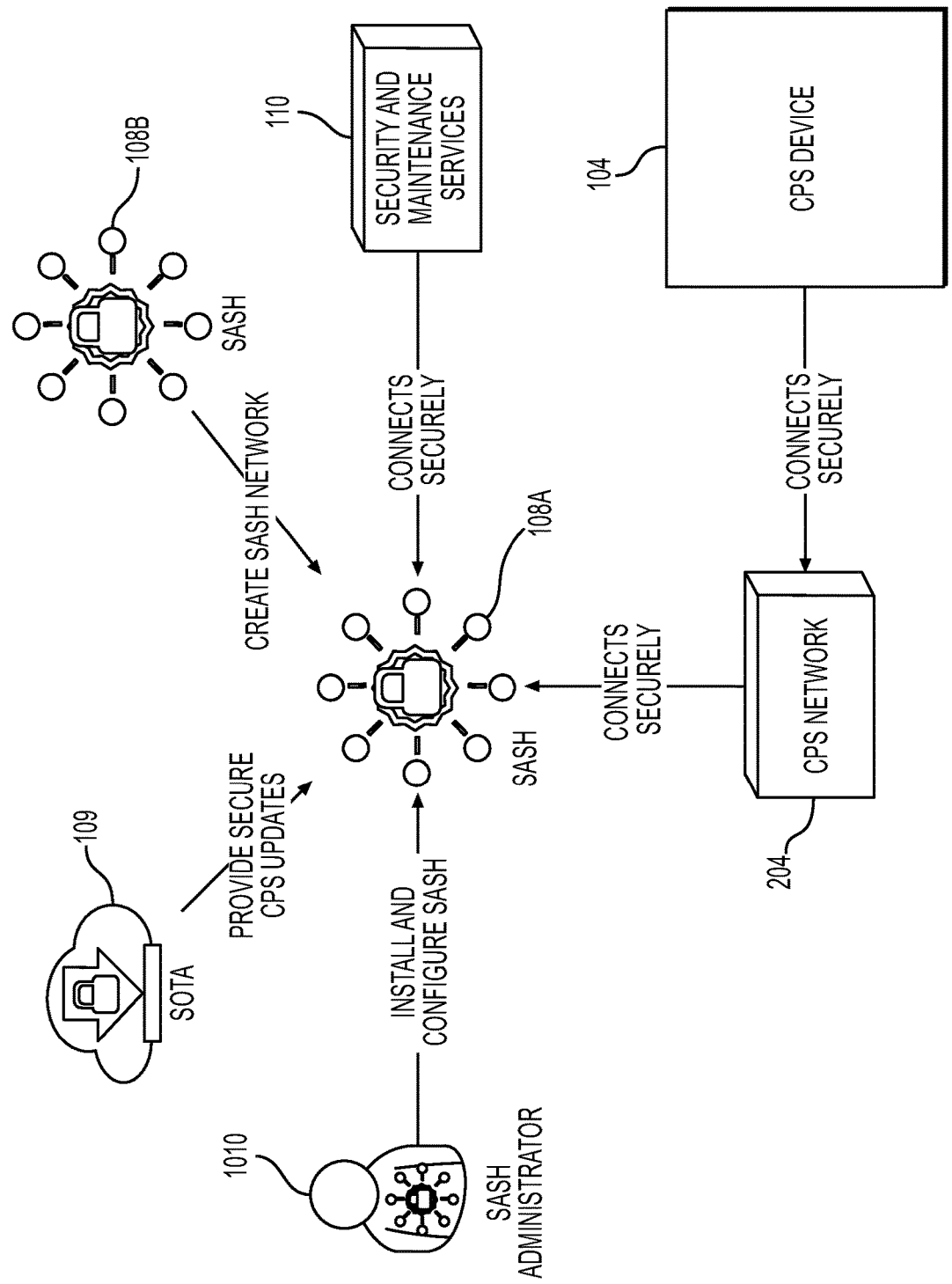
FIG. 10 depicts an example SASH Context Diagram, according to one or more embodiments.

As illustrated in FIG. 10, the SASH 108a interfaces with several external actors and systems, and they are elaborated in the subsections.

According to one or more embodiments, the SASH 108a is a smart bridge capable of communicating, either directly or indirectly, with additional smart bridges and hubs, CPS devices 104, or other CPS Enterprise Services. The SASH 108a serves as a translating gateway to and from Profinet®, and it has the firewall capability to protect traffics send to the CPS network. Finally, it is a Profinet® Supervisor, and a router for both the CPS Enterprise Network and the CPS Network. One or more SASH devices 108b will make up a SASH network.

According to one or more embodiments, the SASH interacts, either directly or indirectly, with the SASH administrator 1010, who may be any administrator with the privilege to administer the SASH. The responsible of this role is to: install SASH, configure SASH, review logs, and/or run diagnostics According to one or more embodiments, the SASH 108a interacts, either directly or indirectly, with Cyber-Physical Systems (e.g., CPS device 104), SOTA 109, SASH 108b, CPS Network 204, and/or Security and Maintenance services 110. The Cyber-Physical System is a system of interacting digital, analog, physical, and human components engineered for function through integrated physics and logic. The SOTA system 109 supports secure distribution of software packages, updates, and data to the CPS staging location, a new CPS maintenance service center, or Profinet® Master Device. The SASH box is a smart bridge or hub capable of communicating directly with additional smart bridges and hubs, CPS devices, or a security provider's SOTA server. The CPS Network 204 is a client-side communications bus, targeting use with the CPS. SASH communications to CPS devices may be layered onto and use a security provider's proprietary communication protocol on this network. Security and Maintenance Services 110 may be additional services provided by a security provider such as the Authentication Manager, Security Logging, Conditional Maintenance monitors, etc., which may require the use of the SASH network to communicate between a security provider's connected devices. The CPS Enterprise Network may be a collection of CPS Enterprise systems providing Custom SOTA, RADS, HEAD, and other capabilities. For the security services, it is used to communicate with the CPS devices 104.

According to one or more embodiments, the SASH system may perform the functions of bridging CPS Enterprise network to CPS network, providing a secure routing among SASHes using TCP/IPSec, providing a firewall for protecting CPS network communications, and/or as a Profinet® Supervisor on its connected CPS network.

Services executing on the CPS Enterprise network include: other SASH devices; SOTA; SMD; RADS 102; HEAD 106; and/or security and management services. Services executing on the CPS network may include CPS devices.

According to one or more embodiments, the SASH will provide one or more of the following capabilities to the SASH administrator: install and configure SASH; perform production testing of the SASH; perform diagnostics of the SASH; view and edit SASH software revisions, firmware revisions, and configuration data; create, modify, and delete CPS firewall configuration and rules; and/or manage routing and bridging configuration and rules.

According to one or more embodiments, the SASH may implement NIST SP 800-53 at moderate impact level.

The below section specifies the functional features of the SASH in terms of use cases and their associated use case paths. The use case model is primarily organized in terms of the externals that benefit from the use cases.

Figure 11:
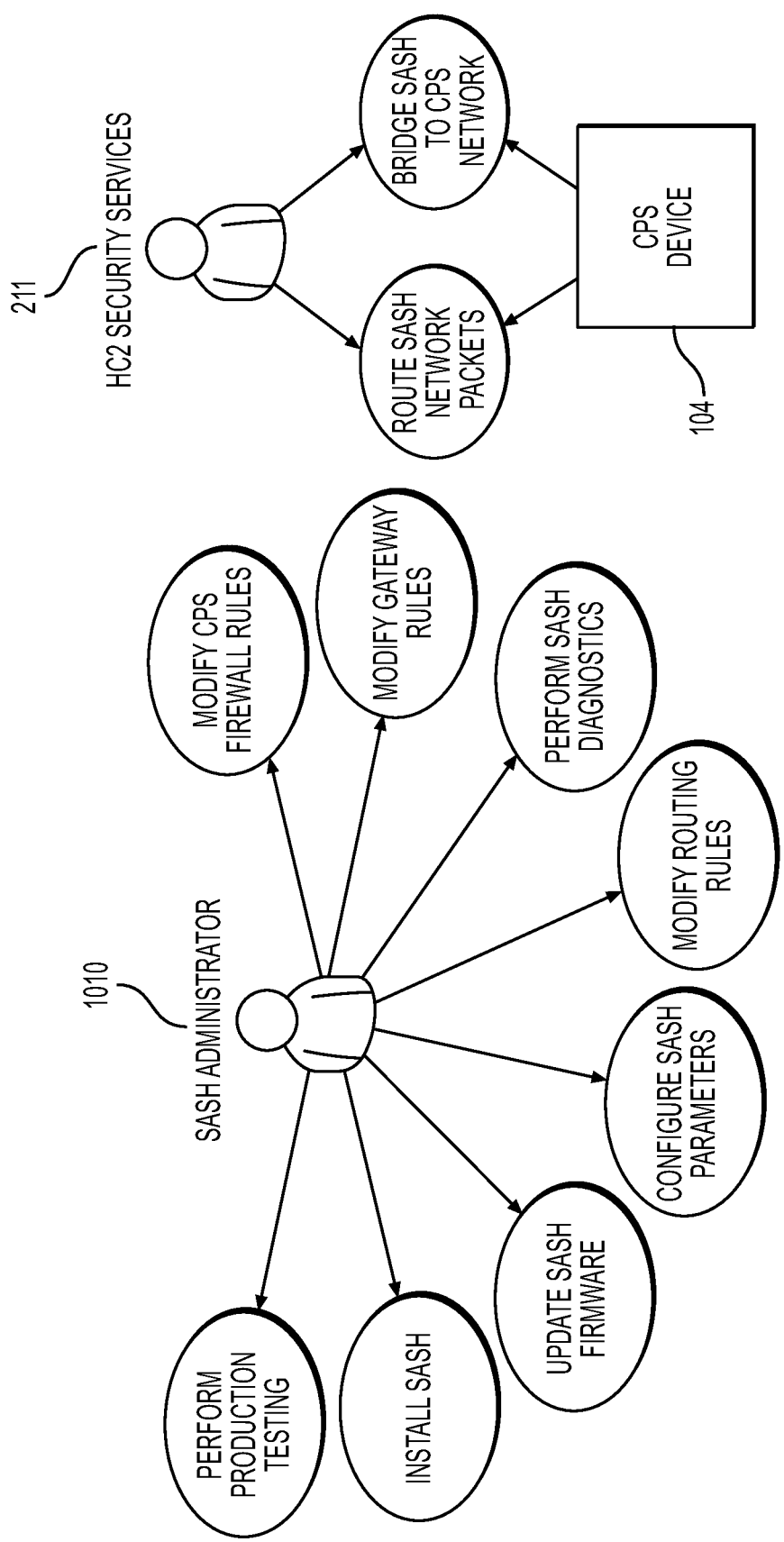
FIG. 11 depicts an example user summary Use Case Diagram, according to one or more embodiments.

FIG. 11 depicts an example User Summary Use Case Diagram, according to one or more embodiments. According to one or more embodiments, the subsection specifies the functional features primarily associated with accountants. A SASH administrator 1010 is a user who interacts with the SASH to install, configure, update and maintain the SASH in the deployment environment. This role may be performed by a user on a CPS platform or a CPS provider who may be using a SASH to perform production and integration testing.

According to one or more embodiments, a SASH administrator 1010 may have the responsibilities of install and configure the SASH; updating firmware of the SASH; configuring operating parameters of the SASH; performing production testing; performing SASH diagnostics; creating, modifying, and deleting CPS firewall configuration and rules; and/or managing routing and bridging configuration and rules.

A SASH administrator may need basic knowledge of SASH administration to effectively interact with the SASH: Basic knowledge of SASH administration.

Figure 12:
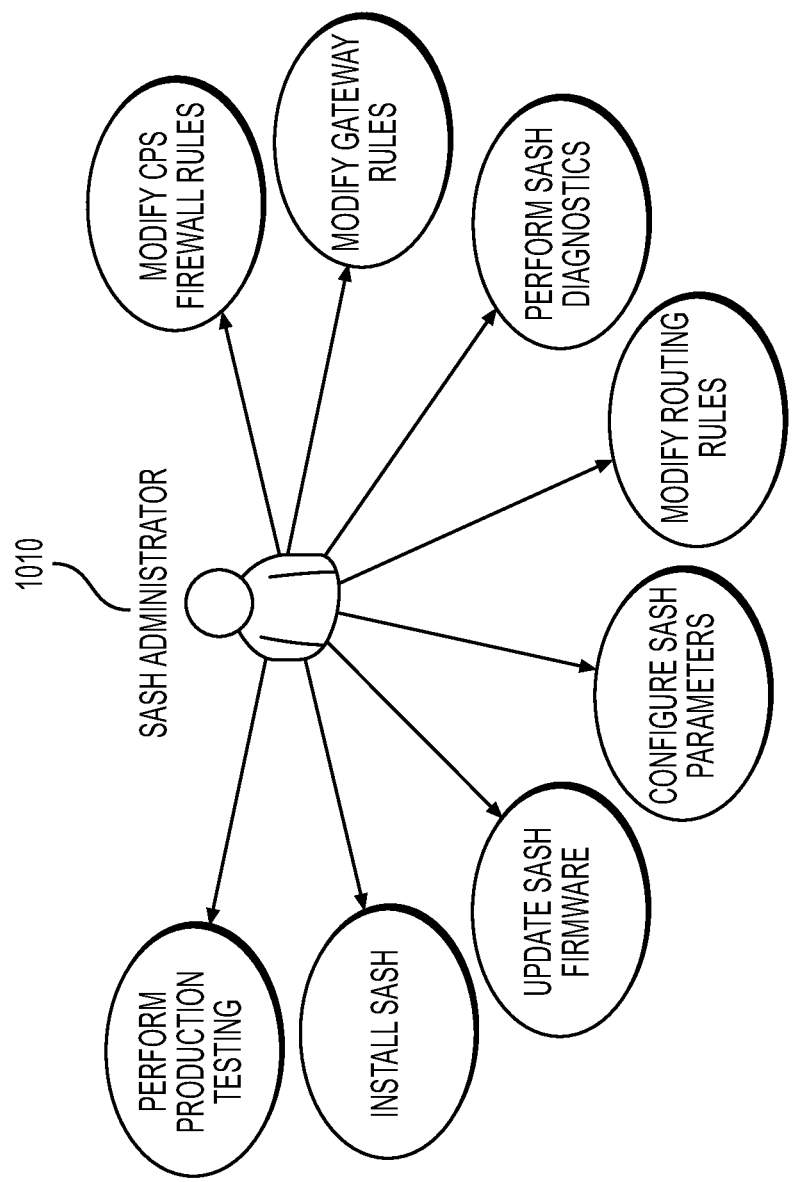
FIG. 12 depicts an example end user Use Case Diagram, according to one or more embodiments.

FIG. 12 depicts an example end user Use Case Diagram, according to one or more embodiments. The use cases may include: SASH administrator installs the SASH; SASH administrator updates the firmware of the SASH; SASH administrator configures SASH operating parameters; SASH administrator performs SASH Diagnostics; SASH administrator performs production testing; SASH administrator modifies CPS Firewall rules; SASH administrator modifies Routing rules; and/or the SASH administrator modifies Bridge rules.

According to one or more embodiments, a use case for a SASH administrator installing the SASH may include feature number: SASH-FUNC-001. The SASH may have the capability for a SASH administrator to perform initial configuration of the SASH box. More specifically, the SASH administrator may physically install all applicable network connections (e.g., Profinet®, SOTA, Security Provider Services, and SMD) to the SASH box. The SASH administrator may apply input power to the SASH box. Using the configuration interface the SASH administrator may configure the SASH box parameters to communicate on each of the networks present and store this configuration in persistent memory. Using the configuration interface the SASH administrator may enable the write-protection of the SASH box.

According to one or more embodiments, a use case for a SASH administrator updating the firmware of the SASH may include feature number: SASH-FUNC-002. The SASH 108a may have the capability for a SASH administrator (End User or CPS Provider) 1010 to perform firmware upgrades of the SASH box. For example, using the configuration interface the SASH administrator may disable the write-protection of the SASH box. Using the configuration interface the SASH administrator may configure the SASH box to accept a firmware update. Using the configuration interface the SASH administrator may push the firmware update to the SASH box. Using the configuration interface the SASH administrator may configure the SASH box operating parameters. Using the configuration interface the SASH administrator may enable the write-protection of the SASH box.

According to one or more embodiments, the use case for the SASH administrator configuring SASH operating parameters may include feature number: SASH-FUNC-003. The SASH 108a may have the capability for a SASH administrator (End User or CPS Provider) 1010 to configure the operating parameters of the SASH box. For example, using the configuration interface the SASH administrator will verify the starting configuration of the SASH box. Using the configuration interface the SASH administrator will disable the write-protection of the SASH box. Using the configuration interface the SASH administrator will update the configuration of the SASH box to desired operating parameters and store this configuration in persistent memory. Using the configuration interface the SASH administrator will enable the write-protection of the SASH box.

According to one or more embodiments, the use case for SASH administrator performing SASH diagnostics may include feature number: SASH-FUNC-004. The SASH may have the capability for a SASH administrator (End User or CPS Provider) to perform diagnostics of the SASH box. For example, The SASH administrator may authenticate as a SASH administrator. Using the maintenance interface the SASH administrator may run the diagnostics procedures and compile the output of these procedures. The SASH administrator may log out of the SASH.

According to one or more embodiments, the use case for SASH administrator performing production testing may include feature number: SASH-FUNC-005. The SASH may have the capability for a SASH administrator to perform firmware upgrades of the SASH device. The SASH administrator may attach the SASH device to the SASH test stand. Using the SASH test stand, the SASH administrator may perform the SASH Acceptance Test Procedure (ATP). Using the SASH test stand, the SASH administrator may configure the SASH device into a non-write protected state with default settings to prepare for delivery.

According to one or more embodiments, the use case for SASH administrator modifying CPS Firewall Rules may include feature number: SASH-FUNC-006. The SASH may have the capability for a SASH administrator to modify the CPS Firewall Rules on the SASH device. The SASH administrator may use the screen on the SASH device to navigate to the CPS Firewall configuration menu. The SASH administrator may use the configuration menu to modify a template or existing rules. The SASH administrator may save the modified CPS Firewall rules and exit from the configuration menu.

According to one or more embodiments, the use case for SASH administrator modifying Gateway Rules may include feature number: SASH-FUNC-007. The SASH may have the capability for a SASH administrator to modify the Gateway Rules on the SASH device. The SASH administrator may use the screen on the SASH device to navigate to the Gateway Rule configuration menu. The SASH administrator may use the configuration menu to modify a template or existing rules. The SASH administrator may save the modified Gateway rules and exit from the configuration menu.

According to one or more embodiments, the use case for SASH administrator modifying Router Rules may include feature number: SASH-FUNC-008. The SASH may have the capability for a SASH administrator to modify the Router Rules on the SASH device. The SASH administrator may use the screen on the SASH device to navigate to the Router Rule configuration menu. The SASH administrator may use the configuration menu to modify a template or existing rules. The SASH administrator may save the modified Gateway rules and exit from the configuration menu.

Figure 13:
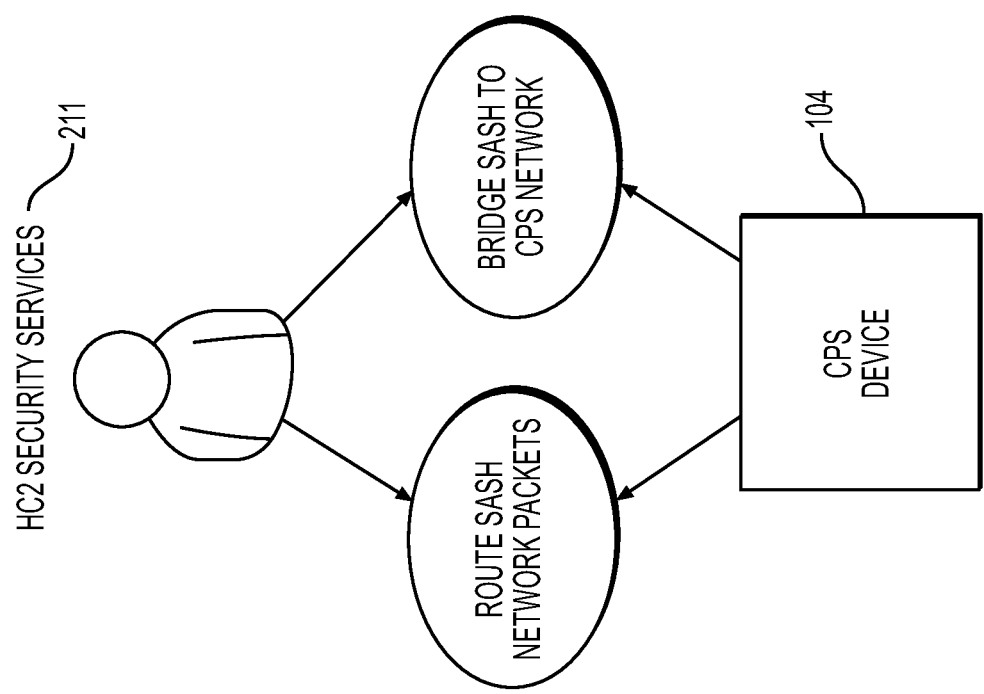
FIG. 13 depicts an example System Device Use Case Diagram, according to one or more embodiments.

FIG. 13 depicts an example System Device Use Case Diagram, according to one or more embodiments. The use cases may include SASH System connects multiple SASH devices; SASH System establishes Secure Communication between SASH devices; SASH System bridges CPS Enterprise Network to Profinet® Network; and/or SASH System establishes Secure Communication between a Security Service on CPS Enterprise Network and CPS device on Profinet® Network.

According to one or more embodiments, the use case for SASH connects multiple SASH devices may include feature number: SASH-FUNC-009. The SASH may have the capability to connect multiple SASH devices to form a SASH network. The SASH device physically connects using the SASH network interface port. The SASH device forms a network allowing communication channels to be formed between systems connected to each SASH device on the SASH network as if they were connected to the same SASH device.

According to one or more embodiments, the use case for SASH System establishes secure communication between SASH Devices may include feature number: SASH-FUNC-010. The SASH may have the capability for a SASH device to establish secure communication between multiple SASH devices. The SASH 108a connects multiple SASH devices 108b. The SASH device creates a secure communication channel between SASH devices.

According to one or more embodiments, the use case for SASH System bridges CPS Enterprise Network to Profinet® Network may include feature number: SASH-FUNC-011. According to one or more embodiments, the SASH may have the capability for a SASH System to bridge the CPS Enterprise Network to the Profinet® network. The SASH System may be physically connected to the CPS Enterprise Network. The SASH System may be physically connected to the Profinet® network as a client device. The SASH System may form a network allowing communication channels to be formed between the CPS Enterprise Network and Profinet® Network.

According to one or more embodiments, the use case for SASH System establishes secure communication between Security Services on CPS Enterprise Service and CPS Device on Profinet® Network may include feature number: SASH-FUNC-012. The SASH may have the capability for a SASH System to establish secure communications between the Security Services server and the CPS. The SASH System may create a secure communication channel between the Security Services server and the CPS device(s) attached to the Profinet® network master device.

According to one or more embodiments, Profinet® Messages are collections of binary data that will traverse the CPS network and will contain many different classes of information including status requests, status messages, command messages, synchronization messages, etc. The SASH may construct some of these messages as a part of its translating gateway functionality.

According to one or more embodiments, TCP/IP Messages are collections of binary data that will traverse the Platform and CPS networks and will contain many different classes of information including status requests, status messages, software and firmware upgrades, synchronization messages, network control messages, etc. The SASH will treat these messages as headers which will provide information used for routing, etc. and as payloads which will be treated as opaque blobs of binary data. The SASH may construct some of these messages as a part of its translating gateway functionality.

According to one or more embodiments, SASH Network Data represents data that allows for operation of the SASH networking services, such as routing tables, IPSec Security Associations, encryption and authentication keys and certificates, and/or firewall rules.

According to one or more embodiments, SASH Firmware is a collection of executable, binary and plain text files that make up the package for updating the SASH. SASH firmware may include SASH Firmware Package (binary file), and/or SASH Firmware Update Readme (e.g., plain text file).

According to one or more embodiments, SASH software is a collection of executable, binary and plain text files that make up the package for updating the SASH. SASH software may include SASH Program (executable file), SASH Software Update Readme (plain text file), and/or SASH Data representing data that resides on the SASH. The data may be SASH Security Log (encrypted file), SASH Configuration (plain text file), and/or SASH Security Configuration File (encrypted file).

According to one or more embodiments, SASH data requirements may include one or more of the following. The SASH may provide the capability to process Profinet® (e.g., SASH-DATA-001). The SASH may provide the capability to process TCP/IP messages (e.g., SASH-DATA-002). The SASH may provide the capability to process the SASH Software and Firmware and other SASH Data (e.g., SASH-DATA-003). The SASH may provide the capabilities to

TABLE 3

Functional Features Summary

| Feature Number | Title |
|---|---|
| SASH-FUNC-001 | Install SASH |
| SASH-FUNC-002 | Update SASH Firmware |
| SASH-FUNC-003 | Configure SASH Parameters |
| SASH-FUNC-004 | Perform SASH Diagnostic Testing |
| SASH-FUNC-005 | Perform production testing of SASH |
| SASH-FUNC-006 | Modify CPS Firewall Rules |
| SASH-FUNC-007 | Modify Gateway Rules |
| SASH-FUNC-008 | Modify Router Rules |
| SASH-FUNC-009 | Connect multiple SASH boxes to form a SASH network |
| SASH-FUNC-010 | Establish Secure Communication between SASH Devices |
| SASH-FUNC-011 | Bridge CPS Enterprise Network to Profinet ® Network |
| SASH-FUNC-012 | Establish Secure Communication Between Honeywell Security Services on CPS Enterprise Service and CPS Device on Profinet ® Network | securely bridge multiple SASH domains to each other to create a single meshed SASH communication network (e.g., SASH-DATA-004).

According to one or more embodiments, hardware requirements for the SASH may include one or more of the following. The SASH may be a stationary device that can be installed to the deployment environment of the Profinet® master devices (e.g., CPS) (e.g., SASH-HW-001). The SASH may be ruggedized for military use (e.g., SASH-HW-002).

According to one or more embodiments, the SASH may have one or more of the following hardware specifications (e.g., SASH-HW-003): persistent memory; volatile memory; processing capacity; processing clock; profibus network port to connect to Profibus Network; Ethernet network ports to connect to CPS Enterprise Network for Security Services (e.g., customer SOTA 109); Ethernet network ports to connect to CPS Network for CPS Devices; and/or capable to operate on similar/same power source as Profinet® master(s)

This section documents the security requirements that specify the extent to which the SASH may protect itself and its sensitive data and communications from accidental, malicious, or unauthorized access, use, modification, destruction, or disclosure. The security requirements may implement security controls that allow the SASH to meet the NIST SP 800-53 requirements such that SASH meets moderator assurance impact level.

Below are the technical moderate impact requirements from NIST SP 800-53 that may be implemented by the SASH:

TABLE 4

Example SASH Features

| SASH # | NIST # | NIST Title | NIST Description |
|---|---|---|---|
| SASH-SEC-001 | AC-4 | Information Flow Enforcement | The information system enforces approved authorizations for controlling the flow of information within the system and between interconnected systems in accordance with applicable policy. |
| SASH-SEC-002 | AC-5 | Separation of Duties | The organization: Separates duties of individuals as necessary, to prevent malevolent activity without collusion; Documents separation of duties; and Implements separation of duties through assigned information system access authorizations. |
| SASH-SEC-003 | AC-6 | Least Privilege | The organization employs the concept of least privilege, allowing only authorized accesses for users (and processes acting on behalf of users) which are necessary to accomplish assigned tasks in accordance with organizational missions and business functions. |
| SASH-SEC-004 | AC-7 | Unsuccessful Login Attempts | The information system: Enforces a limit of [Assignment: organization-defined number] consecutive invalid login attempts by a user during a [Assignment: organization-defined time period]; and Automatically [Selection: locks the account/node for an [Assignment: organization-defined time period]; locks the account/node until released by an administrator; delays next login prompt according to [Assignment: organization-defined delay algorithm]] when the maximum number of unsuccessful attempts is exceeded. The control applies regardless of whether the login occurs via a local or network connection. |
| SASH-SEC-005 | AC-8 | System Use Notification | The information system: Displays an approved system use notification message or banner before granting access to the system that provides privacy and security notices consistent with applicable federal laws, Executive Orders, directives, policies, regulations, standards, and guidance and states that: (i) users are accessing a U.S. Government information system; (ii) system usage may be monitored, recorded, and subject to audit; (iii) unauthorized use of the system is prohibited and subject to criminal and civil penalties; and (iv) use of the system indicates consent to monitoring and recording; Retains the notification message or banner on the screen until users take explicit actions to log on to or further access the information system; and For publicly accessible systems: (i) displays the system use information when appropriate, before granting further access; (ii) displays references, if any, to monitoring, recording, or auditing that are consistent with privacy accommodations for such systems that generally prohibit those activities; and (iii) includes in the notice given to public users of the information system, a description of the authorized uses of the system. |
| SASH-SEC-006 | AC-11 | Session Lock | The information system: Prevents further access to the system by initiating a session lock after [Assignment: organization-defined time period] of inactivity or upon receiving a request from a user; and Retains the session lock until the user reestablishes access using established identification and authentication procedures. |
| SASH-SEC-007 | AC-18 | Wireless Access | The organization: Establishes usage restrictions and implementation guidance for wireless access; Monitors for unauthorized wireless access to the information system; |

TABLE 4-continued

Example SASH Features

| SASH # | NIST # | NIST Title | NIST Description |
|---|---|---|---|
| | | | Authorizes wireless access to the information system prior to connection; and Enforces requirements for wireless connections to the information system. |
| SASH-SEC-008 | AU-2 | Auditable Events | The organization: Determines, based on a risk assessment and mission/business needs, that the information system may be capable of auditing the following events: [Assignment: organization-defined list of auditable events]; Coordinates the security audit function with other organizational entities requiring audit-related information to enhance mutual support and to help guide the selection of auditable events; Provides a rationale for why the list of auditable events are deemed to be adequate to support after-the-fact investigations of security incidents; and Determines, based on current threat information and ongoing assessment of risk, that the following events are to be audited within the information system: [Assignment: organization-defined subset of the auditable events defined in AU-2 a. to be audited along with the frequency of (or situation requiring) auditing for each identified event]. |
| SASH-SEC-009 | AU-3 | Content of Audit Records | The information system produces audit records that contain sufficient information to, at a minimum, establish what type of event occurred, when (date and time) the event occurred, where the event occurred, the source of the event, the outcome (success or failure) of the event, and the identity of any user/subject associated with the event. |
| SASH-SEC-010 | AU-4 | Audit Storage Capacity | The organization allocates audit record storage capacity and configures auditing to reduce the likelihood of such capacity being exceeded. |
| SASH-SEC-011 | AU-5 | Response To Audit Processing Failures | The information system: Alerts designated organizational officials in the event of an audit processing failure; and takes the following additional actions: [Assignment: organization-defined actions to be taken (e.g., shut down information system, overwrite oldest audit records, stop generating audit records)]. |
| SASH-SEC-012 | AU-7 | Audit Reduction and Report Generation | The information system provides an audit reduction and report generation capability. |
| SASH-SEC-013 | AU-8 | Time Stamps | The information system uses internal system clocks to generate time stamps for audit records. |
| SASH-SEC-014 | AU-9 | Protection of Audit Information | The information system protects audit information and audit tools from unauthorized access, modification, and deletion. |
| SASH-SEC-015 | AU-12 | Audit Generation | The information system: Provides audit record generation capability for the list of auditable events defined in AU-2 at [Assignment: organization-defined information system components]; Allows designated organizational personnel to select which auditable events are to be audited by specific components of the system; and Generates audit records for the list of audited events defined in AU-2 with the content as defined in AU-3. |
| SASH-SEC-016 | IA-2 | Identification and Authentication (Organizational Users) | The information system uniquely identifies and authenticates organizational users (or processes acting on behalf of organizational users). |
| SASH-SEC-017 | IA-3 | Device Identification and Authentication | The information system uniquely identifies and authenticates [Assignment: organization-defined list of specific and/or types of devices] before establishing a connection. |
| SASH-SEC-018 | IA-6 | Authenticator Feedback | The information system obscures feedback of authentication information during the authentication process to protect the information from possible exploitation/use by unauthorized individuals |
| SASH-SEC-019 | IA-7 | Cryptographic Module Authentication | The information system uses mechanisms for authentication to a cryptographic module that meet the requirements of applicable federal laws, Executive Orders, directives, policies, regulations, standards, and guidance for such authentication. |

TABLE 4-continued

Example SASH Features

| SASH # | NIST # | NIST Title | NIST Description |
|---|---|---|---|
| SASH-SEC-020 | IA-8 | Identification and Authentication (Non-organizational Users) | The information system uniquely identifies and authenticates non-organizational users (or processes acting on behalf of non-organizational users). |
| SASH-SEC-021 | SC-2 | Application Partitioning | The information system separates user functionality (including user interface services) from information system management functionality. |
| SASH-SEC-022 | SC-4 | Information In Shared Resources | The information system prevents unauthorized and unintended information transfer via shared system resources. |
| SASH-SEC-023 | SC-5 | Denial of Service Protection | The information system protects against or limits the effects of the following types of denial of service attacks: [Assignment: organization-defined list of types of denial of service attacks or reference to source for current list]. |
| SASH-SEC-024 | SC-7 | Boundary Protection | The information system: Monitors and controls communications at the external boundary of the system and at key internal boundaries within the system; and Connects to external networks or information systems only through managed interfaces consisting of boundary protection devices arranged in accordance with an organizational security architecture. |
| SASH-SEC-025 | SC-8 | Transmission Integrity | The information system protects the integrity of transmitted information. |
| SASH-SEC-026 | SC-9 | Transmission Confidentiality | The information system protects the confidentiality of transmitted information. |
| SASH-SEC-027 | SC-10 | Network Disconnect | The information system terminates the network connection associated with a communications session at the end of the session or after [Assignment: organization-defined time period] of inactivity. |
| SASH-SEC-028 | SC-12 | Cryptographic Key Establishment and Management | The organization establishes and manages cryptographic keys for required cryptography employed within the information system. |
| SASH-SEC-029 | SC-13 | Use of Cryptography | The information system implements required cryptographic protections using cryptographic modules that comply with applicable federal laws, Executive Orders, directives, policies, regulations, standards, and guidance. |
| SASH-SEC-030 | SC-14 | Public Access Protections | The information system protects the integrity and availability of publicly available information and applications. |
| SASH-SEC-031 | SC-15 | Collaborative Computing Devices | The information system: Prohibits remote activation of collaborative computing devices with the following exceptions: [Assignment: organization-defined exceptions where remote activation is to be allowed]; and Provides an explicit indication of use to users physically present at the devices. |
| SASH-SEC-032 | SC-20 | Secure Name/Address Resolution Service (Authoritative Source) | The information system provides additional data origin and integrity artifacts along with the authoritative data the system returns in response to name/address resolution queries. |
| SASH-SEC-033 | SC-22 | Architecture and Provisioning for Name/Address Resolution Service | The information systems that collectively provide name/address resolution service for an organization are fault-tolerant and implement internal/external role separation. |
| SASH-SEC-034 | SC-23 | Session Authenticity | The information system provides mechanisms to protect the authenticity of communications sessions. |
| SASH-SEC-035 | SC-28 | Protection of Information At Rest | The information system protects the confidentiality and integrity of information at rest. |
| SASH-SEC-036 | SC-32 | Information System Partitioning | The organization partitions the information system into components residing in separate physical domains (or environments) as deemed necessary. |

Figure 14:
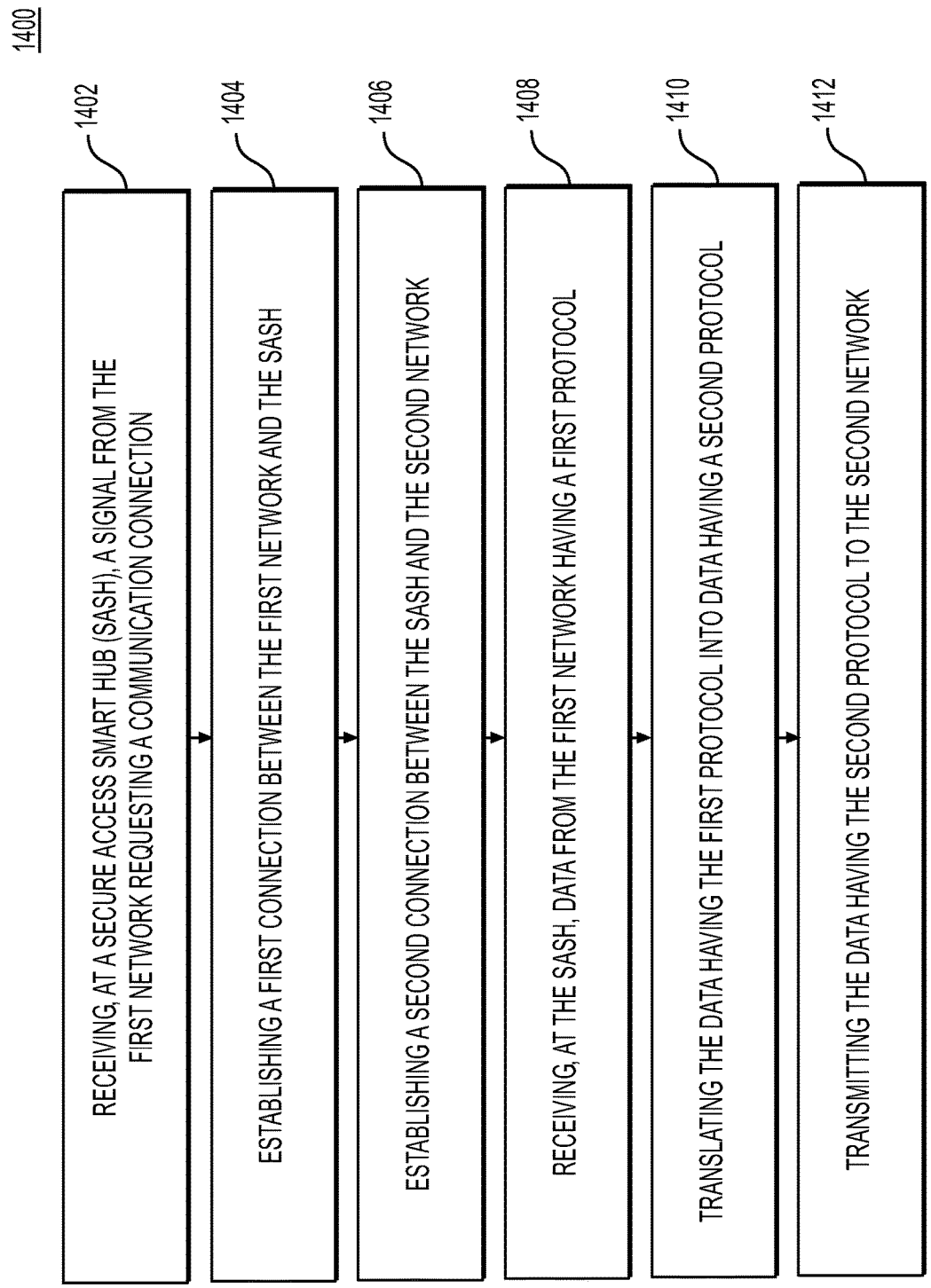
FIG. 14 depicts an example flowchart of a method for securely updating a device, according to one or more embodiments.

FIG. 14 depicts a flowchart of a method 1400 for securely updating a device, according to one or more embodiments. For example, at step 1402, the method may include receiving, at a SASH, a signal from the first network requesting a communication connection. The first network may be a customer SOTA. At step 1404, the method may include establishing a first connection between the first network and the SASH. At step 1406, the method may include establishing a second connection between the SASH and the second network. The second network may be a CPS network. At step 1408, the method may include receiving, at the SASH, data from the first network having a first protocol. The first protocol may be TCP/IP. At step 1410, the method may include translating the data having the first protocol into data having a second protocol. At step 1412, the method may include transmitting the data having the second protocol to the second network.

Figure 15:
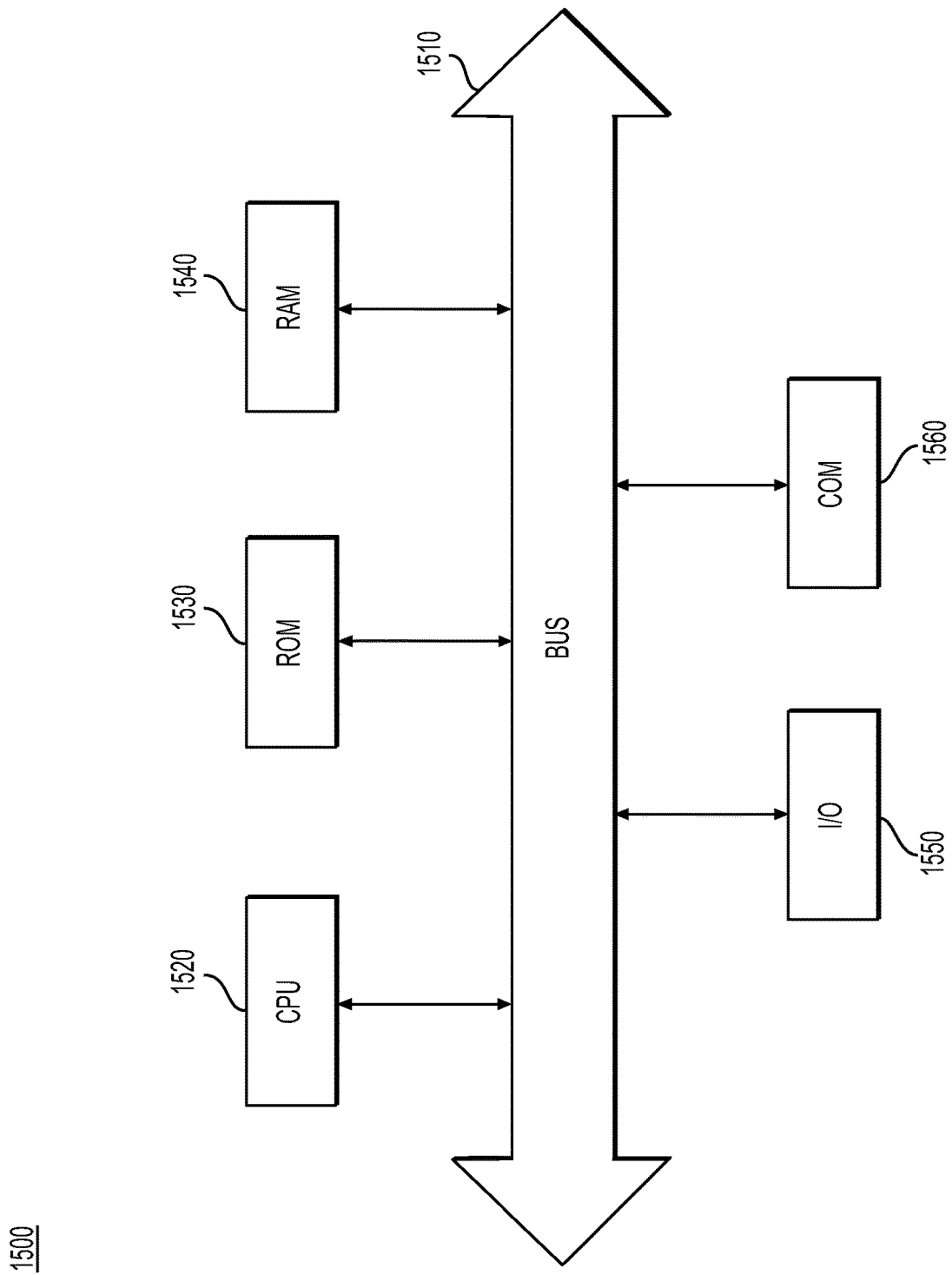
FIG. 15 depicts an exemplary computer device or system, in which embodiments of the present disclosure, or portions thereof, may be implemented.

FIG. 15 depicts an exemplary computer device or system, in which embodiments of the present disclosure, or portions thereof, may be implemented. Each of the computing system(s), databases, user interfaces, and methods described above with respect to FIGS. 1-14 can be implemented via device 1500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-14.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-14, may be implemented using device 1500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 15, device 1500 may include a central processing unit (CPU) 1520. CPU 1520 may be any type of processor device including, for example, any type of special purpose or a general-purpose microprocessor device. As will be appreciated by persons skilled in the relevant art, CPU 1520 also may be a single processor in a multi-core/multi-processor system, such system operating alone, or in a cluster of computing devices operating in a cluster or server farm. CPU 1520 may be connected to a data communication infrastructure 1510, for example, a bus, message queue, network, or multi-core message-passing scheme.

Device 1500 also may include a main memory 1540, for example, random access memory (RAM), and also may include a secondary memory 1530. Secondary memory 1530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1530 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1500.

Device 1500 also may include a communications interface ("COM") 1560. Communications interface 1560 allows software and data to be transferred between device 1500 and external devices. Communications interface 1560 may include a modem, a network interface (such as an Ethernet card), a communications port, a PCMCIA slot and card, or the like. Software and data transferred via communications interface 1560 may be in the form of signals, which may be electronic, electromagnetic, optical, or other signals capable of being received by communications interface 1560. These signals may be provided to communications interface 1560 via a communications path of device 1500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1500 also may include input and output ports 1550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for providing a secure communication between a first network and a second network, the method comprising:
   receiving, at a Secure Access Smart Hub (SASH), a signal from the first network requesting a communication connection;
   establishing a first connection between the first network and the SASH;
   establishing a second connection between the SASH and the second network by creating and hosting a secure virtual private network (VPN) and requesting a connection from a cyber-physical system (CPS) device, wherein the SASH securely connects the CPS device to the first network through the second network;
   receiving, at the SASH, data from the first network having a first protocol;
   translating the data having the first protocol into data having a second protocol; and
   transmitting the data having the second protocol from the SASH to the second network, wherein the second network is a CPS network running fieldbus network protocol supporting real-time and performance constraints, and the second network is restricted to a point to point connection with a master system.

2. The computer-implemented method of claim 1, wherein establishing the first connection comprises establishing a secure enterprise network protocol between the first network and the SASH.

3. The computer-implemented method of claim 1, wherein translating and/or bridging the data having the first protocol comprises decrypting the data from the first network, and re-encrypting the decrypted data into the data having the second protocol.

4. The computer-implemented method of claim 1, wherein the first protocol is a secure TCP/IP protocol.

5. The computer-implemented method of claim 1, wherein the SASH comprises an integrated SASH that includes software components and hardware components, the integrated SASH connecting to the CPS device through the second network.

6. The computer-implemented method of claim 5, wherein the hardware components include a computing platform, an Ethernet interface, and a second network interface.

7. The computer-implemented method of claim 5, wherein the software components include a user domain, a security domain, and a network domain that enables for complete isolation of various types of data.

8. The computer-implemented method of claim 1, wherein the SASH routes network packets from a first device of a first network subgroup to a second device in a second network subgroup.

9. The computer-implemented method of claim 1, the SASH comprises one or more security filters enabling a user to configure policies that control a type of data sent to a specific CPS device.

10. A system for providing a secure communication between a first network and a second network, the system comprising:
    a memory storing instructions; and
    a processor executing the instructions to perform a process including:
    receiving, at a Secure Access Smart Hub (SASH), a signal from the first network requesting a communication connection;
    establishing a first connection between the first network and the SASH;
    establishing a second connection between the SASH and the second network by creating and hosting a secure virtual private network (VPN) and requesting a connection from a cyber-physical system (CPS) device, wherein the SASH securely connects the CPS device to the first network through the second network;
    receiving, at the SASH, data from the first network having a first protocol;
    translating the data having the first protocol into data having a second protocol; and
    transmitting the data having the second protocol from the SASH to the second network, wherein the second network is a CPS network running fieldbus network protocol supporting real-time and performance constraints, and the second network is restricted to a point to point connection with a master system.

11. The system of claim 10, wherein establishing the first connection comprises establishing a secure enterprise network protocol between the first network and the SASH.

12. The system of claim 10, wherein translating and/or bridging the data having the first protocol comprises decrypting the data from the first network, and re-encrypting the decrypted data into the data having the second protocol.

13. The system of claim 10, wherein the first protocol is a secure TCP/IP protocol.

14. The system of claim 10, wherein the SASH comprises an integrated SASH that includes software components and hardware components, the integrated SASH connecting to the CPS device through the second network.

15. The system of claim 14, wherein the software components include a user domain, a security domain, and a network domain that enables for complete isolation of various types of data.

16. The system of claim 10, wherein the SASH routes network packets from a first device of a first network subgroup to a second device in a second network subgroup.

17. The system of claim 10, the SASH comprises one or more security filters enabling a user to configure policies that control a type of data sent to a specific CPS device.

18. A non-transitory computer-readable medium storing instructions that, when executed by a processor, cause the processor to perform an operation for providing a secure communication between a first network and a second network, the operation comprising:

receiving, at a Secure Access Smart Hub (SASH), a signal from the first network requesting a communication connection;

establishing a first connection between the first network and the SASH;

establishing a second connection between the SASH and the second network by creating and hosting a secure virtual private network (VPN) and requesting a connection from a cyber-physical system (CPS) device, wherein the SASH securely connects the CPS device to the first network through the second network;

receiving, at the SASH, data from the first network having a first protocol;

translating the data having the first protocol into data having a second protocol; and transmitting the data having the second protocol from the SASH to the second network, wherein the second network is a CPS network running fieldbus network protocol supporting real-time and performance constraints, and the second network is restricted to a point to point connection with a master system.

* * * * *